United States Patent
Noble et al.

(10) Patent No.: US 9,851,613 B2
(45) Date of Patent: Dec. 26, 2017

(54) ELECTRO-OPTIC VARIABLE APERTURE LENS

(71) Applicant: Apple Inc., Cupertino, CA (US)

(72) Inventors: Hannah Dustan Noble, Mountain View, CA (US); Iain Alexander McAllister, Cambpell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/257,803

(22) Filed: Apr. 21, 2014

(65) Prior Publication Data

US 2015/0241751 A1    Aug. 27, 2015

Related U.S. Application Data

(60) Provisional application No. 61/943,151, filed on Feb. 21, 2014.

(51) Int. Cl.
| | |
|---|---|
| *G02F 1/15* | (2006.01) |
| *G02F 1/157* | (2006.01) |
| *G02B 5/00* | (2006.01) |
| *G03B 9/02* | (2006.01) |
| *G02B 27/58* | (2006.01) |

(52) U.S. Cl.
CPC ............ *G02F 1/157* (2013.01); *G02B 5/005* (2013.01); *G02B 27/58* (2013.01); *G03B 9/02* (2013.01); *Y10T 29/49826* (2015.01)

(58) Field of Classification Search
CPC .... G02B 17/0892; G02B 27/58; G02B 5/005; A61B 3/1015; G03F 7/70108; A61F 2/1654; C08J 2383/06; C08J 2383/07; C08J 3/246; C08J 3/28; G02F 1/157; G03B 9/02; Y10T 29/49826

USPC .......................................... 359/265, 739–740
See application file for complete search history.

(56) References Cited

U.S. PATENT DOCUMENTS

| | | | | |
|---|---|---|---|---|
| 4,066,335 A | * | 1/1978 | Courtney ................. | G02B 3/12 |
| | | | | 349/200 |
| 4,902,115 A | * | 2/1990 | Takahashi .............. | G02B 5/005 |
| | | | | 348/335 |
| 5,289,316 A | * | 2/1994 | Furter ........................... | 359/669 |

(Continued)

FOREIGN PATENT DOCUMENTS

| | | |
|---|---|---|
| CN | 101 473 439 A | 7/2009 |
| JP | 2007-292997 | 11/2007 |

(Continued)

OTHER PUBLICATIONS

PCT International Search Report and Written Opinion of the International Searching Authority for PCT/US2015/013978 dated Mar. 12, 2015.

(Continued)

*Primary Examiner* — Thomas K Pham
*Assistant Examiner* — Vipin Patel
(74) *Attorney, Agent, or Firm* — Blakely Sokoloff Taylor & Zafman LLP

(57) ABSTRACT

A variable aperture lens and methods of forming such lenses are disclosed. More particularly, embodiments of the variable aperture lens include an electro-optic aperture sandwiched between a front lens and a rear lens along an optical axis. The front lens or the rear lens may include multiple lens layers having different optical properties to provide for a low z-height, optically aligned, variable aperture lens.

19 Claims, 23 Drawing Sheets

(56) References Cited

U.S. PATENT DOCUMENTS

| | | | |
|---|---|---|---|
| 5,471,339 A | 11/1995 | Ise et al. | |
| 6,079,827 A * | 6/2000 | Coleman | B24B 9/14 |
| | | | 351/159.62 |
| 6,426,492 B1 | 7/2002 | Bos et al. | |
| 6,667,471 B2 | 12/2003 | Bos et al. | |
| 6,906,842 B2 * | 6/2005 | Agrawal | G02F 1/1523 |
| | | | 359/265 |
| 8,730,554 B2 * | 5/2014 | Ushigome | 359/275 |
| 2007/0139792 A1 * | 6/2007 | Sayag | 359/739 |
| 2009/0052303 A1 * | 2/2009 | Mukoh et al. | 369/112.01 |
| 2010/0271714 A1 * | 10/2010 | Duparre | G02B 3/0031 |
| | | | 359/797 |
| 2013/0094073 A1 | 4/2013 | Ushigome | |
| 2013/0206323 A1 * | 8/2013 | Blackburn et al. | 156/145 |
| 2013/0215489 A1 | 8/2013 | Blackburn et al. | |

FOREIGN PATENT DOCUMENTS

| | | |
|---|---|---|
| TW | 201340310 | 10/2013 |
| WO | WO 2013/028481 A1 | 2/2013 |

OTHER PUBLICATIONS

ROC (Taiwan) Search Report Patent Application No. 104105720, 1 pg. dated Sep. 14, 2016.
PCT Chapter I International Preliminary Report on Patentability (IPER) for PCT Application No. PCT/US2015/013978 dated Sep. 1, 2016, 7 pages.

* cited by examiner

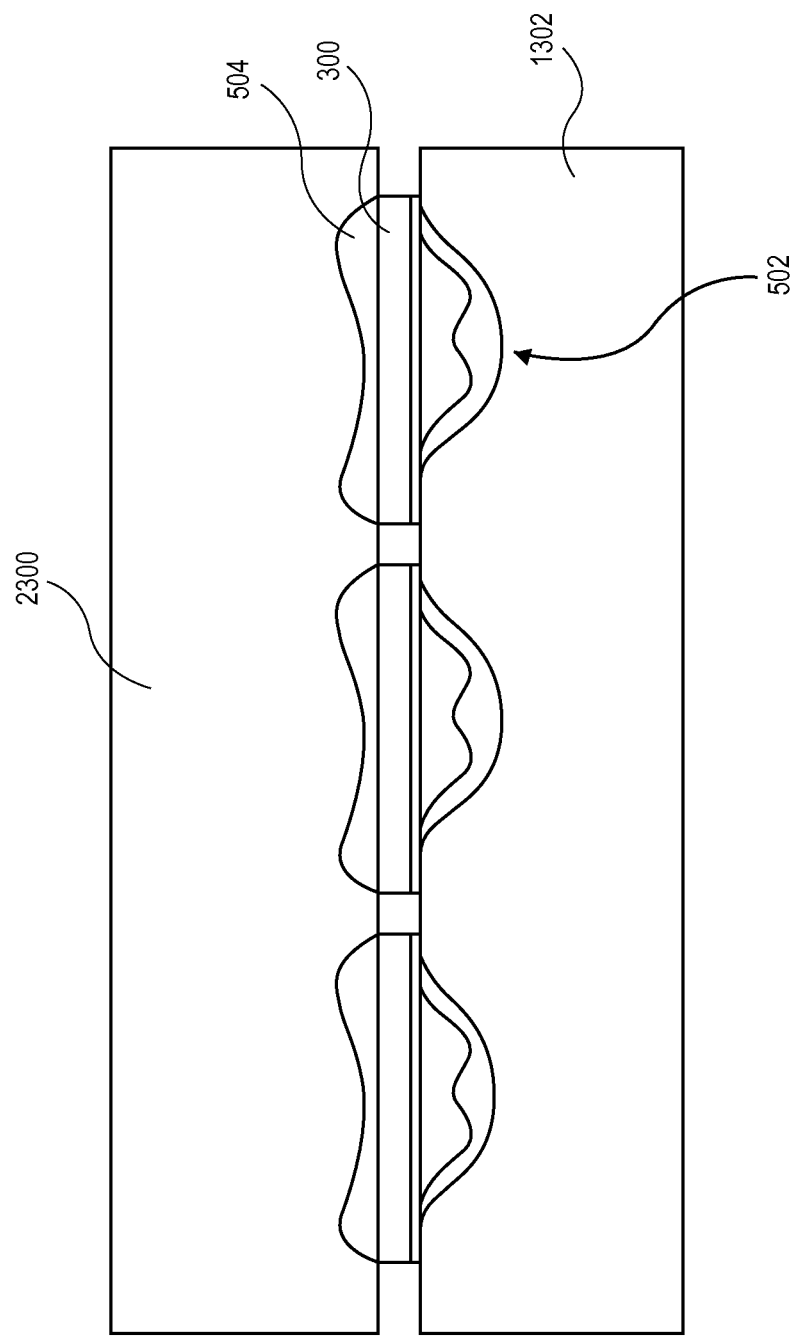

ELECTRO-OPTIC VARIABLE APERTURE LENS

RELATED APPLICATIONS

Applicant claims the benefit of priority of prior, provisional application Ser. No. 61/943,151 filed Feb. 21, 2014, the entirety of which is incorporated by reference.

BACKGROUND

Field

Embodiments related to optical elements having electro-optic variable apertures, are disclosed. More particularly, an embodiment related to an electro-optic variable aperture lens for use in a camera, is disclosed.

Background Information

Camera modules have been incorporated in a variety of consumer electronics devices, including smart phones, mobile audio players, personal digital assistants, and both portable and desktop computers. A typical camera module includes an optical system used to collect and transmit light from an imaged scene to an image sensor. The optical system generally includes at least one lens associated with one aperture. The lens collects and transmits light. The aperture limits the light collected and transmitted by the lens, and is therefore termed the stop aperture, or alternatively, the entrance pupil) aperture. The effective diameter of the stop aperture combined with the lens focal length determines the "F number" of the lens. A lens with a lower F number produces a brighter image than a lens with a larger F number and, as a result, reduces the image noise in a low light scene. However, as the F number is reduced, the lens depth of field decreases and, as a result, lens aberrations increase. Thus, there is an optimal stop aperture diameter, dependent on the lens and the scene being imaged, to minimize image noise and maximize image resolution.

In most portable consumer electronics devices, minimizing device profile is an important design goal. Accordingly, device profile requirements generally prohibit the use of an iris diaphragm as a variable stop aperture. Thus, product designs often aim to minimize the device profile, known as z-height, by fixing the aperture diameter in the optical system for a particular zoom factor. This design choice minimizes the F number without noticeably affecting achievable resolution, both from design and manufacturing standpoints. As a result of this design paradigm, users have been unable to adjust and optimize the F number for a particular scene in a mobile application.

SUMMARY

Optical elements having electro-optic variable apertures, particularly for use in portable consumer electronics device applications, are disclosed. In an embodiment, an optical element is provided having a front lens, a rear lens, and an electro-optic aperture. The rear lens may be aligned with the front lens along an optical axis and the electro-optic aperture may be coupled, e.g., joined, attached, fixed, or otherwise secured, to at least one of the front lens or the rear lens. In an embodiment, the front lens is attached to the electro-optic aperture and the electro-optic aperture is between the front lens and the rear lens.

The electro-optic aperture may include an electrochromic element coupled with a substrate. For example, the electro-optic aperture may include a variable pupil aligned with the front lens and the rear lens along the optical axis. The electrochromic element of the electro-optic aperture may include at least one of a liquid, a crystalline material, or a non-crystalline material.

In an embodiment, at least one of the front lens or the rear lens includes a plurality of lens layers. For example, the plurality of lens layers may be formed from a plurality of resins having different optical properties and at least one of the resins may be curable by ultraviolet radiation. The front lens and the rear lens may combine to form an achromatic lens.

The optical element may include other components. For example, in an embodiment, the optical element may include an electro-optic filter between the front lens and the rear lens. Additionally, the optical element may include an electrical contact on the substrate, and the electrical contact may be exposed from the front lens and the rear lens.

In an embodiment, a method of producing a mobile lens assembly is provided. The method includes attaching a front lens to a front surface of an electro-optic aperture. The electro-optic aperture may include an electrochromic element coupled with a substrate. The method may also include attaching a rear lens to a rear surface of the electro-optic aperture to form a variable aperture lens. The attaching may include aligning the front lens, the rear lens, and the electro-optic aperture along an optical axis. The attaching may further include molding at least one of the front lens or the rear lens directly over the electro-optic aperture. For example, the molding may include introducing a lens resin in an uncured state and curing the lens resin into a cured state. The method may further include combining the variable aperture lens with a lens stack to form a mobile lens assembly, forming a hybrid system. The lens stack may include one or more aberration-correction lenses.

In an embodiment, the method may include molding a first resin into a first lens layer and overmolding a second resin into a second lens layer over the outer lens layer to form the front lens. The first resin and the second resin may have different optical properties. In an embodiment, a film may be deposited between the front surface and at least one of the front lens or the rear lens. Furthermore, the method may include molding a third resin into the rear lens. At least one of the first resin, the second resin, or the third resin may be configured to be cured by ultraviolet radiation.

BRIEF DESCRIPTION OF THE DRAWINGS

FIGS. 19-23 are pictorial views illustrating operations in forming a variable aperture lens in accordance with an embodiment.

DETAILED DESCRIPTION

Figure 1:
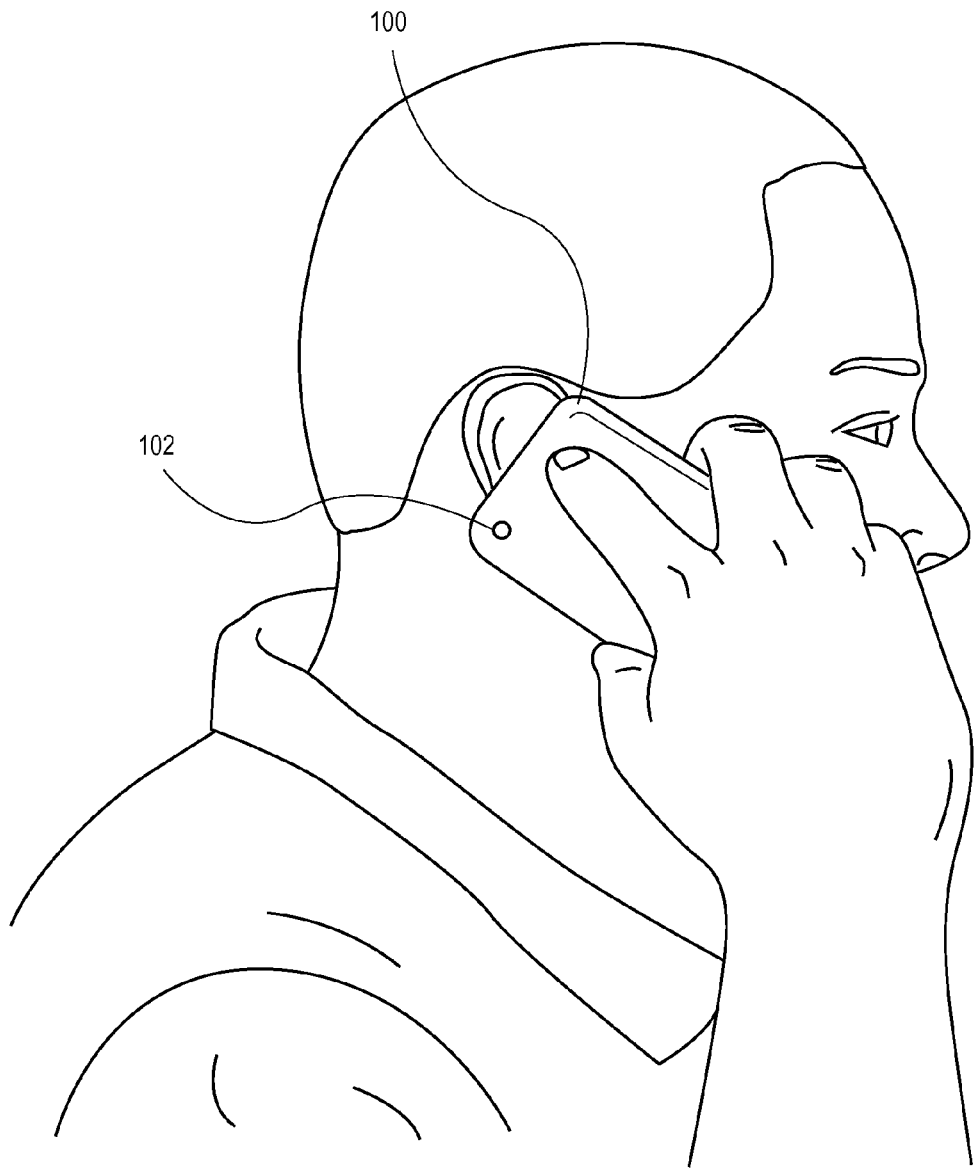
FIG. 1 is a pictorial view of a portable consumer electronics device having a camera module.

Embodiments describe optical elements having electro-optic variable apertures, particularly for use in portable consumer electronics device applications. However, while some embodiments are described with specific regard to integration within mobile electronics device, the embodiments are not so limited and certain embodiments may also be applicable to other uses. For example, an optical element having an electro-optic variable aperture may be incorporated into camera modules that remain at fixed locations, e.g., traffic cameras, or used in relatively stationary applications, e.g., as a lens in a multimedia disc player.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment", or the like, means that a particular feature, structure, configuration, or characteristic described is included in at least one embodiment. Thus, the appearance of the phrase "one embodiment," "an embodiment", or the like, in various places throughout this specification are not necessarily referring to the same embodiment. Furthermore, the particular features, structures, configurations, or characteristics may be combined in any suitable manner in one or more embodiments.

In an aspect, a camera module incorporates a variable aperture lens such that a user may vary a lens F number without significantly increasing the space required for the optical system. In an embodiment, the variable aperture lens includes an electro-optic aperture sandwiched between a front lens and a rear lens. Furthermore, the front lens or the rear lens may include a multi-layered construction, allowing the variable aperture lens to replace an achromatic doublet without increasing the z-height. The multiple layers may, for example, both spherical and aspherical contours and different optical properties.

In an aspect, a camera module incorporates a variable aperture lens such that a user may vary a lens F number without degrading the system optics. In an embodiment, the variable aperture lens incorporates multiple lens layers having different optical properties that create the functionality of an achromatic doublet. Furthermore, the variable aperture lens includes an electro-optic aperture between the lens layers in an optimized position in the optical system such that vignetting is avoided. Furthermore, the variable aperture lens components may be fixed relative to each other along an optical axis such that the variable aperture lens remains optically aligned throughout use.

Referring to FIG. 1, a pictorial view of a portable consumer electronics device having a camera module is shown. A portable consumer electronics device 100, e.g., a smartphone, is being held by a user. As mentioned above, portable consumer electronics device 100 may be another, not necessarily portable, device. In an embodiment, portable consumer electronics device 100 includes an integrated camera module 102 that incorporates a mobile lens assembly.

Figure 2:
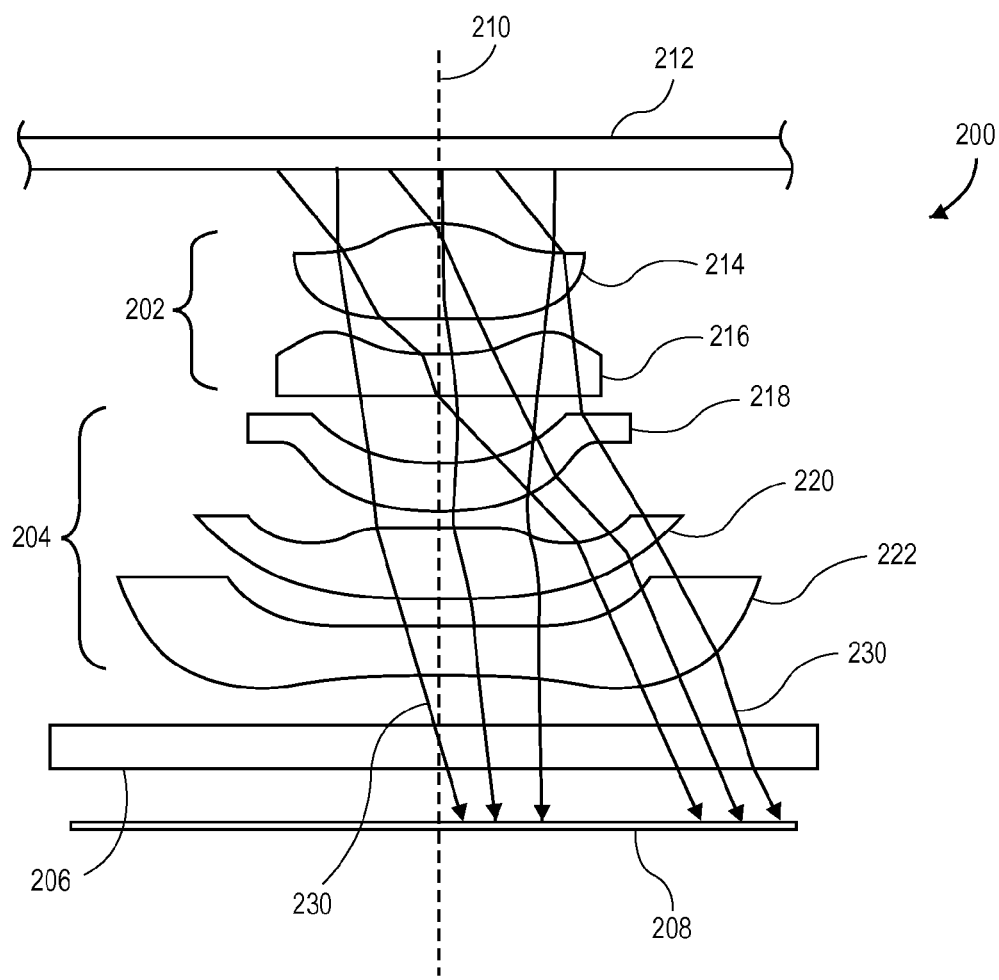
FIG. 2 is a side view of a mobile lens assembly.

Referring to FIG. 2, a side view of a mobile lens assembly is shown. A mobile lens assembly 200 may be considered to be typical of portable consumer electronics devices 100 having camera module 102 with a fixed aperture. The mobile lens assembly 200 may incorporate a doublet 202 and a lens stack 204. One or more filters, such as infrared filter 206, may also be aligned with mobile lens assembly 200 to reflect or block certain wavelengths of light that a user does not wish to transmit to an image sensor 208. Thus, mobile lens assembly 200 may include numerous lenses, filters, and other optical components aligned along an optical axis 210 between an external window 212 and image sensor 208. External window 212 may, for example, be a transparent glass or polymer window located substantially coplanar with a mobile device housing.

The various optical components of mobile lens assembly 200 may be paired or grouped to achieve various optical functionalities. For example, doublet 202 may function as an achromatic lens to limit the effects of chromatic aberration. More specifically, doublet 202 may be an achromatic doublet 202 having lens one 214 and lens two 216. Lens one 214 may be a positive element and lens two 216 may be a negative element. The lenses may be formed and mounted such that the chromatic aberration of lens one 214 is counterbalanced by the chromatic aberration of lens two 216. More specifically, the shape and materials of the lens one 214 and lens two 216 may be varied to complement each other and achieve the desired chromatic aberration correction.

In an embodiment, lens stack 204 functions to limit the effects of monochromatic aberrations. More specifically, lens stack 204 may include lens three 218, lens four 220, and lens five 222, each of which is formed and mounted to correct optical aberrations caused by the geometry of the lenses. The number and shapes of the hybrid lenses is shown by way of example, and other numbers or shapes of the lenses may be used to correct the targeted optical aberrations, such as spherical aberrations.

Still referring to FIG. 2, in an embodiment, a plurality of image rays 230 are reflected or emitted from a scene and transmit through external window 212, mobile lens assembly 200, and infrared filter 206, to image sensor 208. A relative illumination of image sensor 208 by image rays 230 may depend on both placement of an aperture and an angle of incidence of image rays 230 relative to optical axis 210, i.e., the object angle. For example, as the distance between an aperture and lens one 214 is increased or as the object angle is increased, relative illumination of image sensor 208 decreases. This drop in relative illumination indicates vignetting, a generally undesirable phenomenon that is an important consideration when incorporating a variable aperture into an optical system. Thus, incorporation of a variable aperture along the optical path may require that the variable aperture be located to limit vignetting, as well as z-height.

The incorporation of a variable aperture in an imaging system has been suggested to improve focusing and depth of field. Technologies exist to realize such a variable aperture, such as artificial muscles or electro-optic apertures. Electro-optic apertures may include, for example, an electrochromic medium to attenuate light from a scene as it passes through the aperture. The stop aperture diameter may be varied based on a voltage applied to the electro-optic aperture components. However, such solutions suffer from integration problems.

Figure 3:
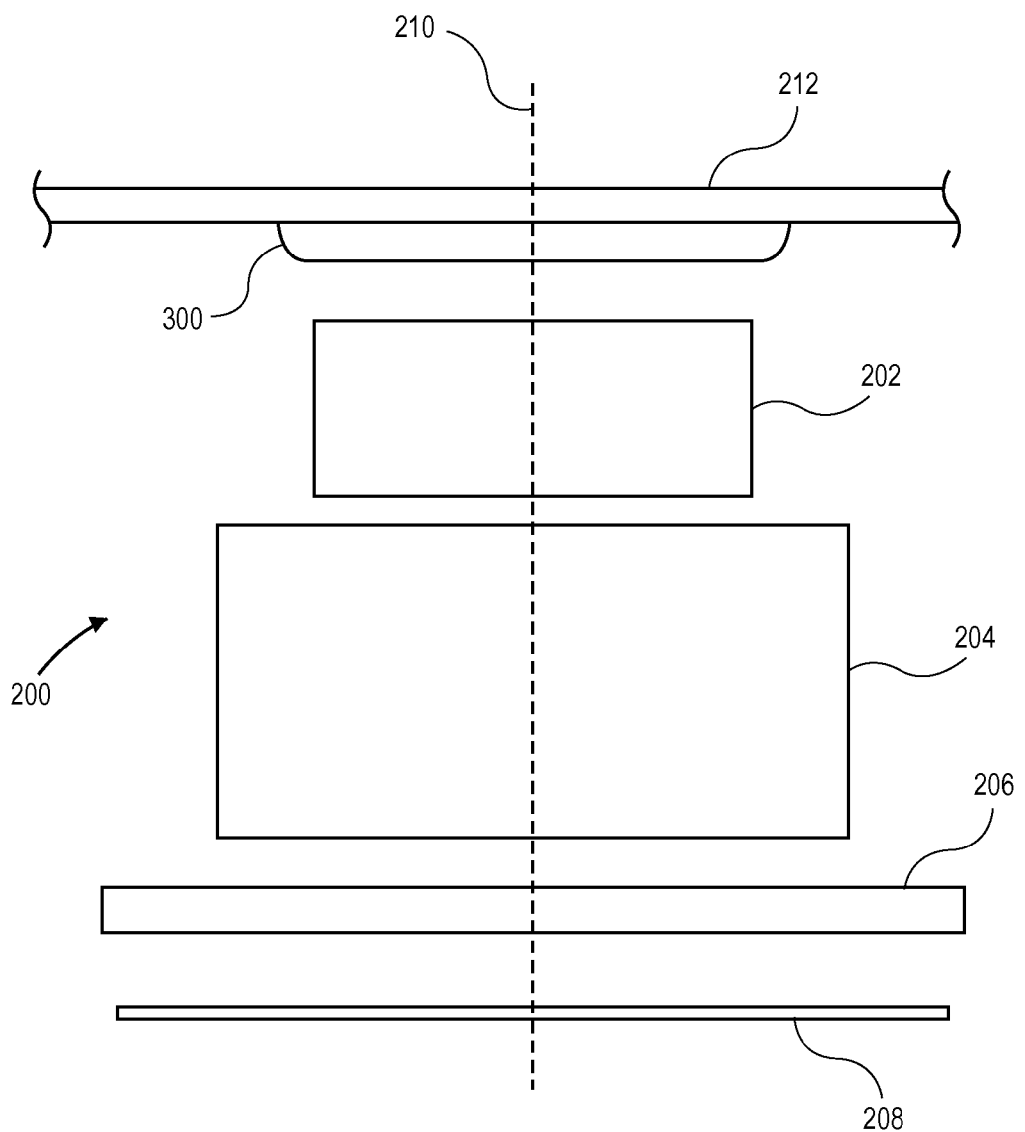
FIG. 3 is a schematic view of a mobile lens assembly having an electro-optic aperture in front of a doublet.

Referring to FIG. 3, a schematic view of a mobile lens assembly having an electro-optic aperture in front of a doublet is shown. Introducing an electro-optic aperture 300 in front of doublet 202, such as when it is mounted on external window 212, results in several trade-offs. First, since electro-optic aperture 300 must be spaced apart from lens one 214, relative illumination of image sensor 208, i.e., vignetting, is increased. To mitigate such vignetting, the semi-diameters of doublet 202 lenses may be increased. However, this increase in lens thickness, as well as the fact that electro-optic aperture 300 requires its own plane, results in an overall increase in system z-height. Furthermore, given the spacing between system optics, alignment of electro-optic aperture 300 with doublet 202 lenses along optical axis 210 can be difficult to perfect, and thus, overall lens performance may be degraded. Finally, in an optical system that utilizes autofocus, complexities in changing the F number in relation to focus make overall system management difficult to achieve.

Figure 4:
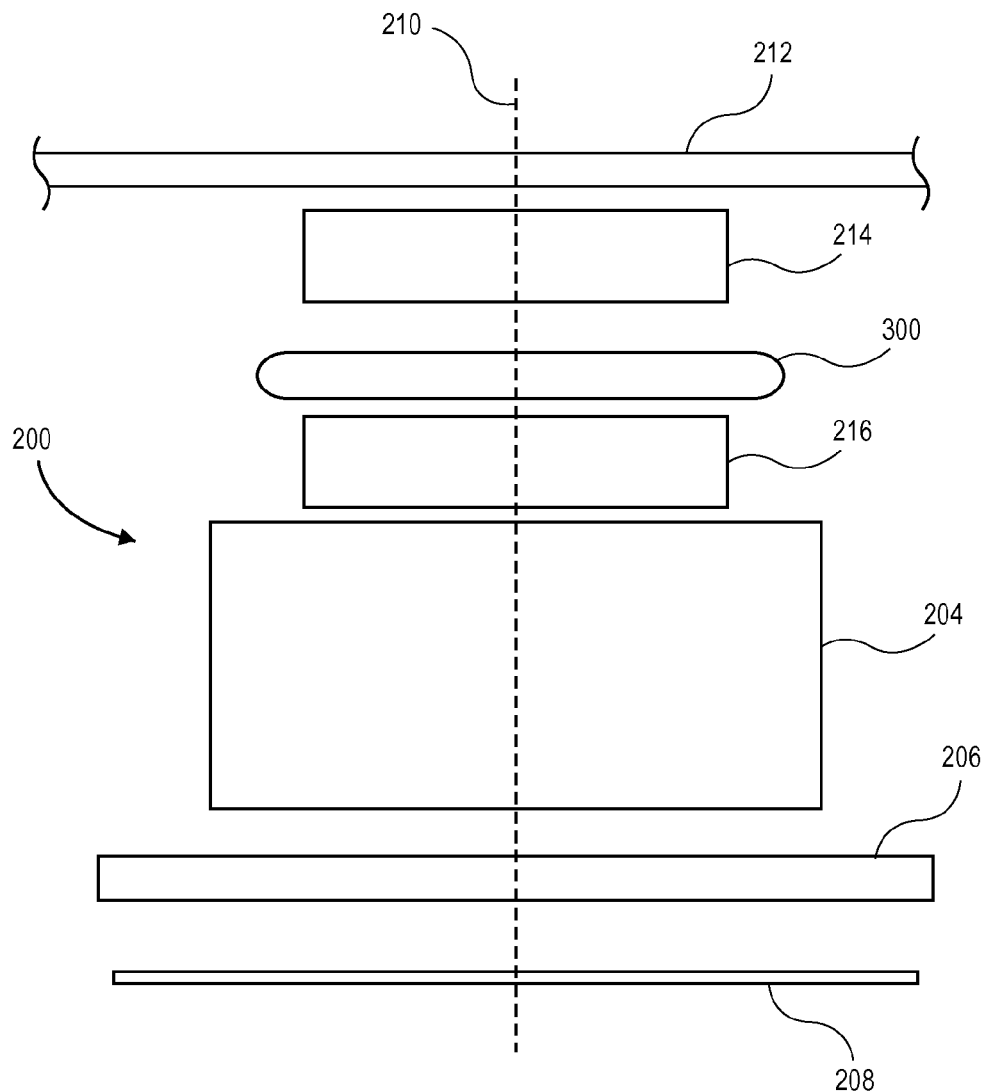
FIG. 4 is a schematic view of a mobile lens assembly having an electro-optic aperture behind a first lens element of a doublet.

Referring to FIG. 4, a schematic view of a mobile lens assembly having electro-optic aperture behind a first lens element of a doublet is shown. Introducing electro-optic aperture 300 behind lens one 214 results in similar trade-offs to those discussed in relation to FIG. 3. For example, placing electro-optic aperture 300 between doublet 202 lenses requires an increase in lens one 214 and lens two 216 separation, resulting in increased z-height. Additionally, alignment between lens one 214 and lens two 216 along optical axis 210 is critical to overall lens performance and thus, since placement of electro-optic aperture 300 between doublet 202 lenses may promote misalignment, image degradation may result.

Figure 5:
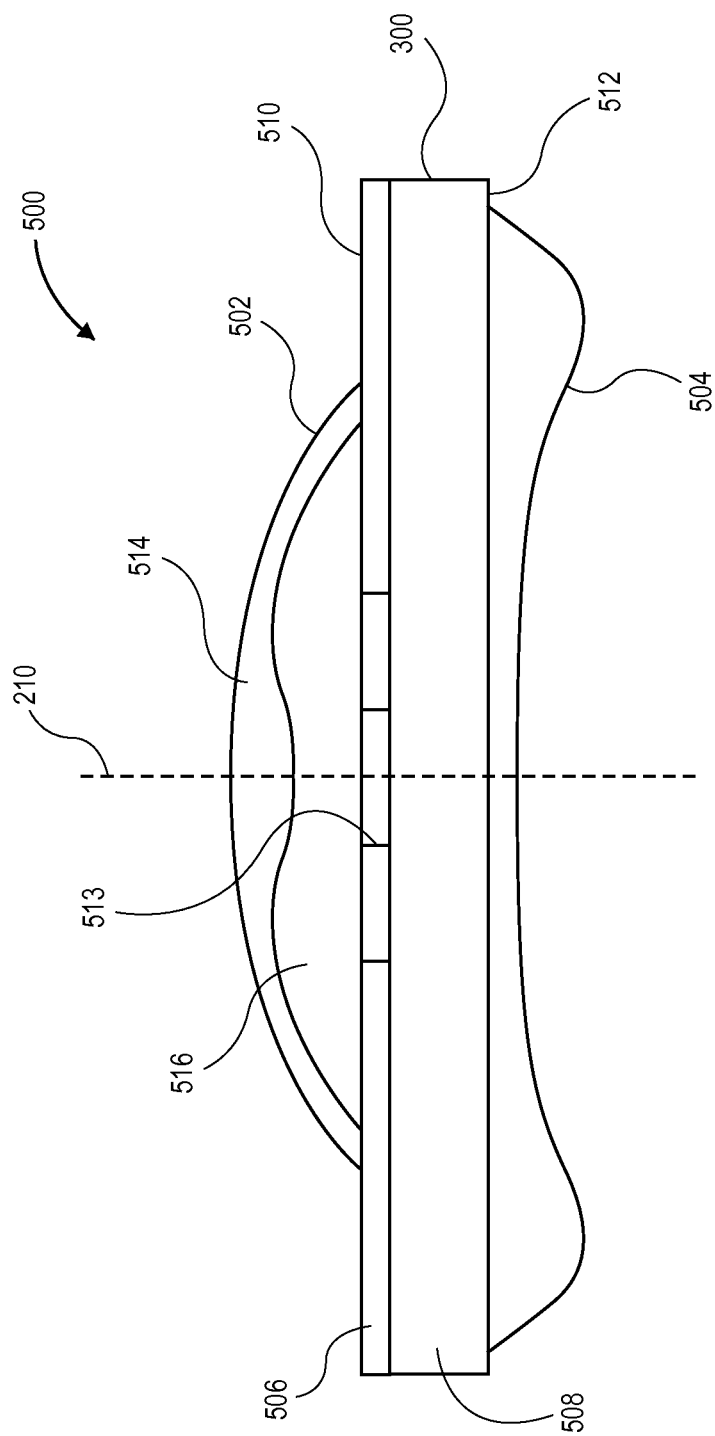
FIG. 5 is a cross-sectional view of a variable aperture lens in accordance with an embodiment.

Referring to FIG. 5, a cross-sectional view of a variable aperture lens is shown in accordance with an embodiment. In an embodiment, a variable aperture lens 500 may include an electro-optic aperture 300 and one or more lenses integrated into a single optical element. For example, electro-optic aperture 300 may be located between a front lens 502 and a rear lens 504. Thus, in an embodiment, variable aperture lens 500 replaces doublet 202 and electro-optic aperture 300 in mobile lens assembly 200 of FIGS. 3 and 4.

In an embodiment, electro-optic aperture 300 includes an electrochromic element 506 on a substrate 508. Electro-optic aperture 300 effectively provides a pupil whose width or size is electrically variable. When the pupil has been electrically controlled into a small or narrow opening, highly collimated image rays 230 are admitted toward image sensor 208. By contrast, when the pupil is configured into a large or wide opening, un-collimated rays are admitted toward image sensor 208. As previously discussed, the pupil size controls the stop aperture, and thus, influences image quality. Various embodiments of electro-optic aperture 300 are described below, but in at least one embodiment, electro-optic aperture 300 includes front surface 510 on electrochromic element 506 and rear surface 512 on substrate 508.

Although not evident in FIG. 5, electrochromic element 506 may include multiple component layers that combine to create an electrically variable pupil 513. For example, an ion source, an ion conduction layer, and an active electrochromic layer may be arranged between substrate 508 and one or more transparent conductors electrically connected to a variable voltage source, as described further below. By varying the voltage supplied to the transparent conductors, an effective diameter of the active electrochromic layer may be varied to provide a desired pupil 513 size.

Substrate 508 may be any material having structural and optical characteristics suitable for the present application. More specifically, substrate 508 may be adequately rigid to support electrochromic element 506. Furthermore, substrate 508 may be adequately transparent to permit light passing from front lens 502 through electrochromic element 506 to transmit onward toward rear lens 504. Accordingly, substrate 508 material candidates may include glass, sapphire, or polycarbonate, to name a few. Thus, substrate 508 may include a rigid, transparent, film or cylindrical object with one or more flat surface. In an embodiment, a diameter or maximum dimension of substrate 508 is greater than a diameter of front lens 502 or rear lens 504, such that an edge of electro-optic aperture 300 extends laterally beyond an edge of front lens 502 and/or rear lens 504.

In an embodiment, front lens 502 and/or rear lens 504 may include a multi-layered structure. For example, front lens 502 may include an outer lens layer 514 and an inner lens layer 516. The layers may have a laminate structure. The multiple layers may be shaped to achieve the desired optical characteristics, e.g., chromatic aberration correction or focal properties. As an example, outer lens layer 514 may include a convexity near optical axis 210 and inner lens layer 516 may include a meshing concavity in the same region. Furthermore, each of the multiple layers, e.g., outer lens layer 514 and inner lens layer 516, may have be formed from the same or different materials and those materials may include the same or different optical characteristics, e.g., indices of refraction. Accordingly, the complementary geometries and optical properties of outer lens layer 514 and inner lens layer 516 may form a composite lens structure that provides a positive element of a doublet lens, like lens one 214.

In an embodiment, front lens 502, electro-optic aperture 300, and rear lens 504 may be aligned along optical axis 210. More specifically, an optical axis 210 of each of front lens 502, electro-optic aperture 300, and rear lens 504 may be coaxially arranged along optical axis 210. Since front lens 502, rear lens 504, and electro-optic aperture 300 may be fixed relative to each other, this coaxial arrangement may be maintained regardless of system movement. Furthermore, since the interfacing surfaces of front lens 502, electro-optic aperture 300, and rear lens 504 may be fixed relative to each other in a coplanar fashion at front surface 510 and rear surface 512, respectively, the angular alignment between variable aperture lens 500 components may be maintained regardless of system movement. Accordingly, optical alignment between variable aperture lens 500 components, once set, may remain stable throughout system use.

Variable aperture lens 500 may be constructed in numerous fashions within the scope of this disclosure. In an embodiment, each of front lens 502, electro-optic aperture 300, and rear lens 504 may be formed separately and then aligned and integrated with each other using thermal or adhesive bonding processes. In another embodiment, variable aperture lens 500 may be formed through a single process that includes a plurality of overmolding or replication steps in which front lens 502 is formed, electro-optic aperture 300 is deposited on front lens 502, and rear lens 504 is formed over electro-optic aperture 300. Molding of lenses on electro-optic aperture may be performed directly, i.e., uncured resin may be introduced over a surface of electro-optic aperture and cured to a cured state in order to form an integrated body having an electro-optic aperture and a lens. In an alternative embodiment, a hybrid process of molding and bonding steps may be used. In other embodiments, press fits, mechanical fasteners, or other known fastening techniques may be used to physically connect variable aperture lens 500 components. Examples of such processes are described in more detail with respect to FIGS. 9-23 below. Thus, it will be appreciated that variable aperture lens 500 may be manufactured according to numerous methods.

Figure 6:
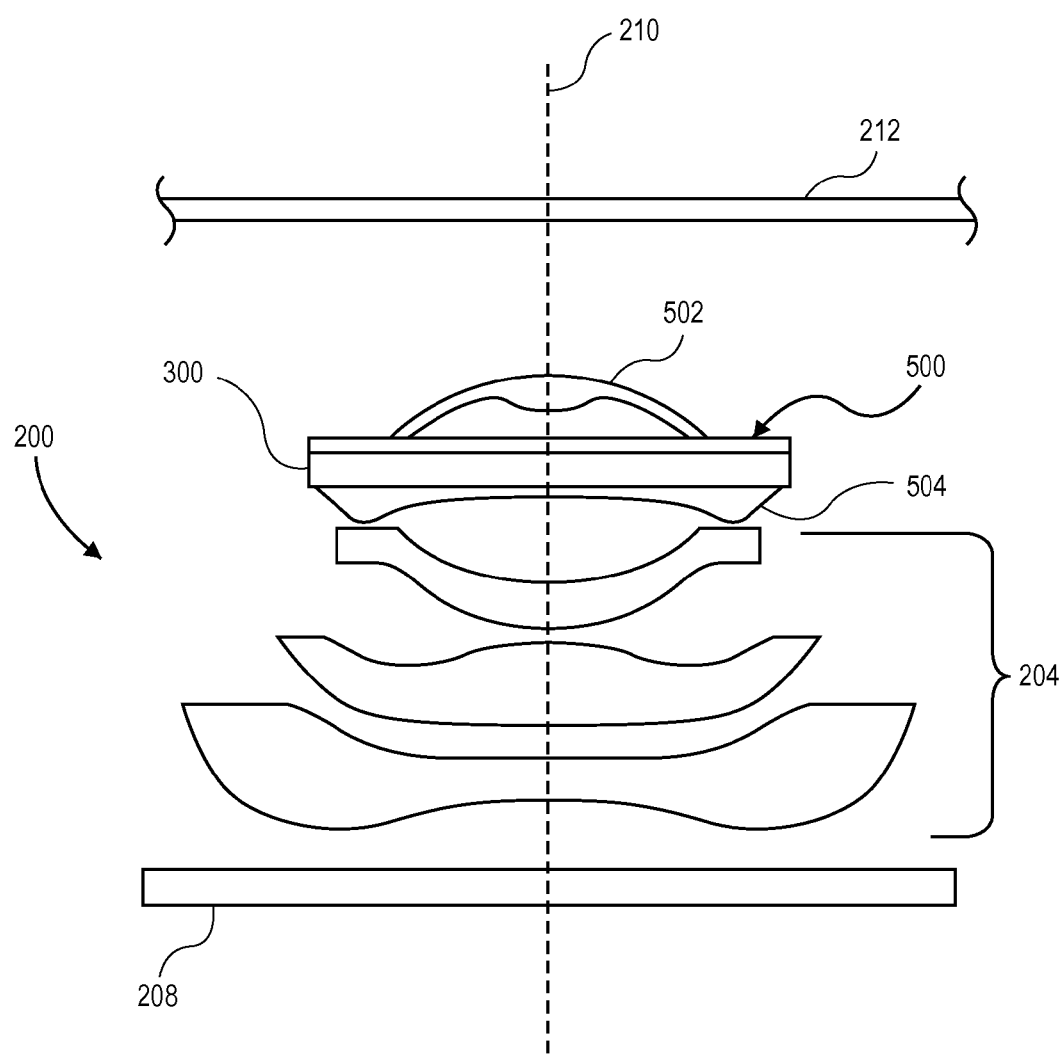
FIG. 6 is a side view of a mobile lens assembly having a variable aperture lens in accordance with an embodiment.

Referring to FIG. 6, a side view of a mobile lens assembly having a variable aperture lens is shown in accordance with an embodiment. Variable aperture lens 500 may replace doublet 202 in mobile lens assembly 200. That is, as a result of the multi-layered structural shape and optical properties, front lens 502 may effectively replace the function of lens one 214 in mobile lens assembly 200. For example, front lens 502 having one or more layers may provide a positive element. Similarly, the shape and optical properties of rear lens 504 may be such that rear lens 504 may effectively replace the function of lens two 216 in mobile lens assembly 200 described above. For example, rear lens 504 may provide a negative element. The geometry and optical properties of each lens, as well as each layer in each lens, of variable aperture lens 500, may be varied to complement each other and achieve the desired chromatic aberration correction. Furthermore, given that variable aperture lens 500 components mate with each other and remain robustly aligned, the integration of electro-optic aperture 300 does not require additional physical separation between front lens 502 and rear lens 504 or introduce alignment instabilities. Thus, variable aperture lens 500 may be used in mobile lens assembly 200 without appreciably increasing device z-height or degrading optical system performance.

Figure 7:
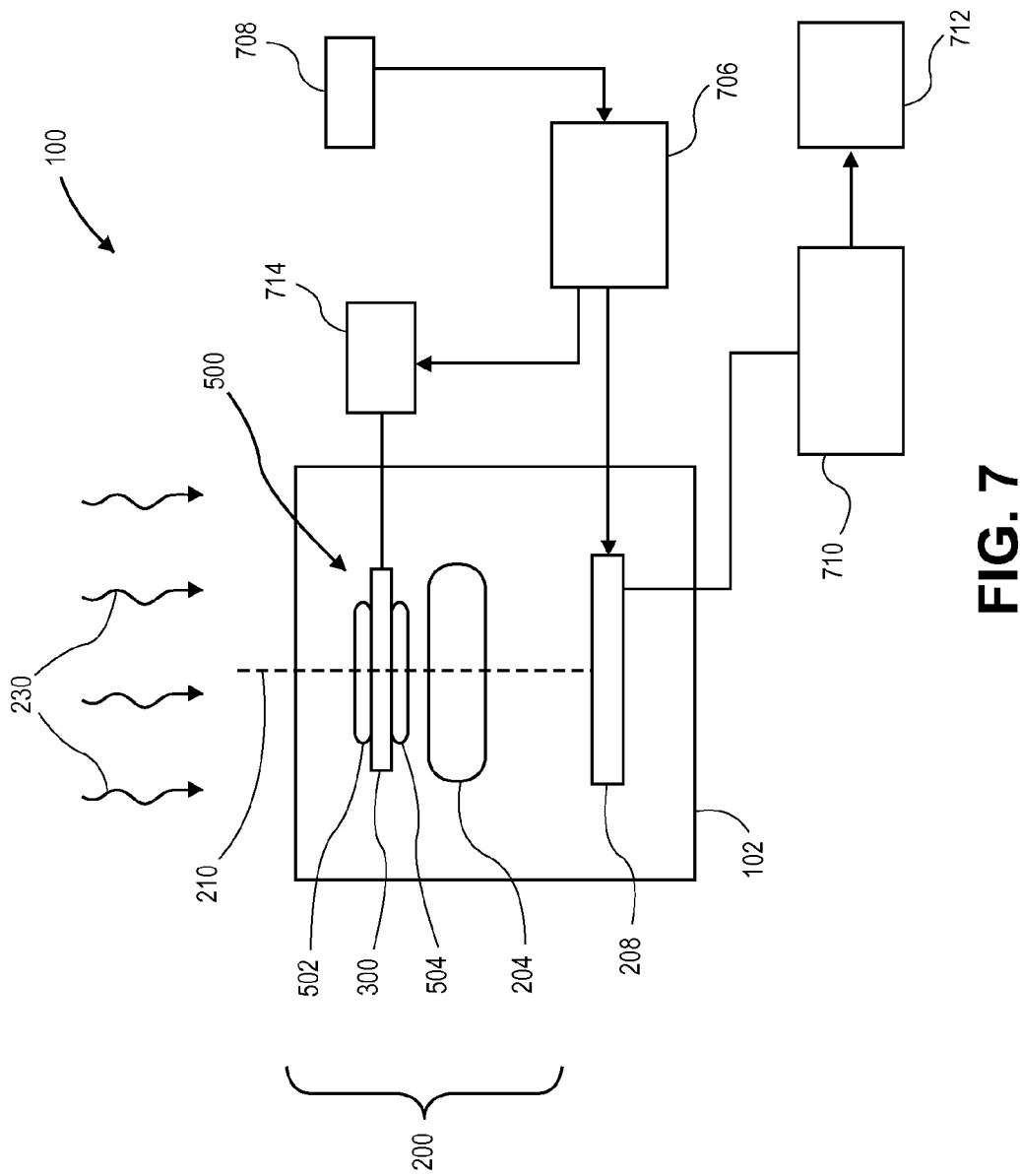
FIG. 7 is a schematic view of camera related elements including a camera module having a variable aperture lens in accordance with an embodiment.

Referring to FIG. 7, a schematic view of camera related elements including a camera module having a variable aperture lens is shown in accordance with an embodiment. In an embodiment, portable consumer electronics device 100 includes camera module 102 having mobile lens assembly 200 axially aligned with image sensor 208. In an embodiment, mobile lens assembly 200 includes variable aperture lens 500, which includes front lens 502, electro-optic aperture 300, and rear lens 504, physically connected and axially aligned with each other. Variable aperture lens 500 and lens stack 204, as well as each sub-component or sub-element of variable aperture lens 500 and lens stack 204 may be optically aligned along optical axis 210. However, in some embodiments, rather than each optical element being physically located along a straight line, one or more mirrors or optical deflectors may be used to allow one or more of the optical elements to be physically arranged in a non-linear fashion. Nonetheless, given that image rays 230 may propagate from a scene along optical axis 210 through such optical elements and mirrors, variable aperture lens 500 and lens stack 204 may be considered to be optically aligned along optical axis 210 in any case.

Although discussion to this point has focused primarily on the function of mobile lens assembly 200 to correct chromatic and monochromatic aberrations, it will be appreciated that the various lenses ultimately function to focus image rays 230 from a scene onto image sensor 208. More specifically, some portion of mobile lens assembly 200 may include either a fixed focus optical subsystem or a variable focus subsystem that implements an autofocus mechanism. There may also be an optical zoom mechanism as part of mobile lens assembly 200. Thus, one or more of front lens 502, rear lens 504, or various lenses of lens stack 204 function to produce an optical image on an active pixel array portion of image sensor 208. Accordingly, image sensor 208 may be any conventional solid-state imaging sensor such as a complimentary metal-oxide-semiconductor (CMOS) sensor chip, able to capture the focused optical image.

Image capture may be affected by an exposure controller 706 interfaced with image sensor 208 and various mechanisms used to adjust mobile lens assembly 200. Image sensor 208 may receive certain parameters for determining an exposure for taking a picture from exposure controller 706. The sensor parameters may include pixel integration time, which may be set by exposure controller 706 in accordance with any suitable exposure control algorithm that considers various input variables (e.g., level of scene illumination and the availability of a flash or strobe illumination). Exposure controller 706 may automatically perform the algorithm to determine an appropriate exposure setting and then signal image sensor 208 to update its parameters in response to actuation of a shutter release 708. Exposure controller 706 may be implemented as a programmed processor or as a completely hardwired logic state machine together with stored parameter options. In an embodiment, exposure controller 706 sets parameters for lens position that can be used to drive mechanisms to control an optical zoom lens or an autofocus mechanism.

Once a digital image representing image rays 230 is captured by image sensor 208 under the chosen exposure setting, the digital image may be transferred to an image storage 710. Image storage 710 may be a solid state volatile or non-volatile memory. Digital images stored in image storage 710 may be accessed for further processing and analysis by higher layer camera functions 712. Such processing may yield, by way of example, a compressed image file in a JPEG format or a compressed video file in an MPEG format.

In an embodiment, a driver circuit 714 controls the effective pupil size of electro-optic aperture 300. Driver circuit 714 may receive a control signal or command from exposure controller 706, which represents the desired pupil size. In response to this command, driver circuit 714 may output an appropriate drive voltage to electrical contacts on electro-optic aperture 300 in variable aperture lens 500 in order to create the desired stop aperture for the image being shot.

In addition to the functionality described above, portable consumer electronics device 100 may include numerous other functions implemented with components not shown. For example, portable consumer electronics device 100 may include a communication network interface, a display screen, a touch screen, a keyboard, or an audio transducer, to name a few. Thus, the system configuration of portable consumer electronics device 100 described above is not restrictive.

Figure 8:
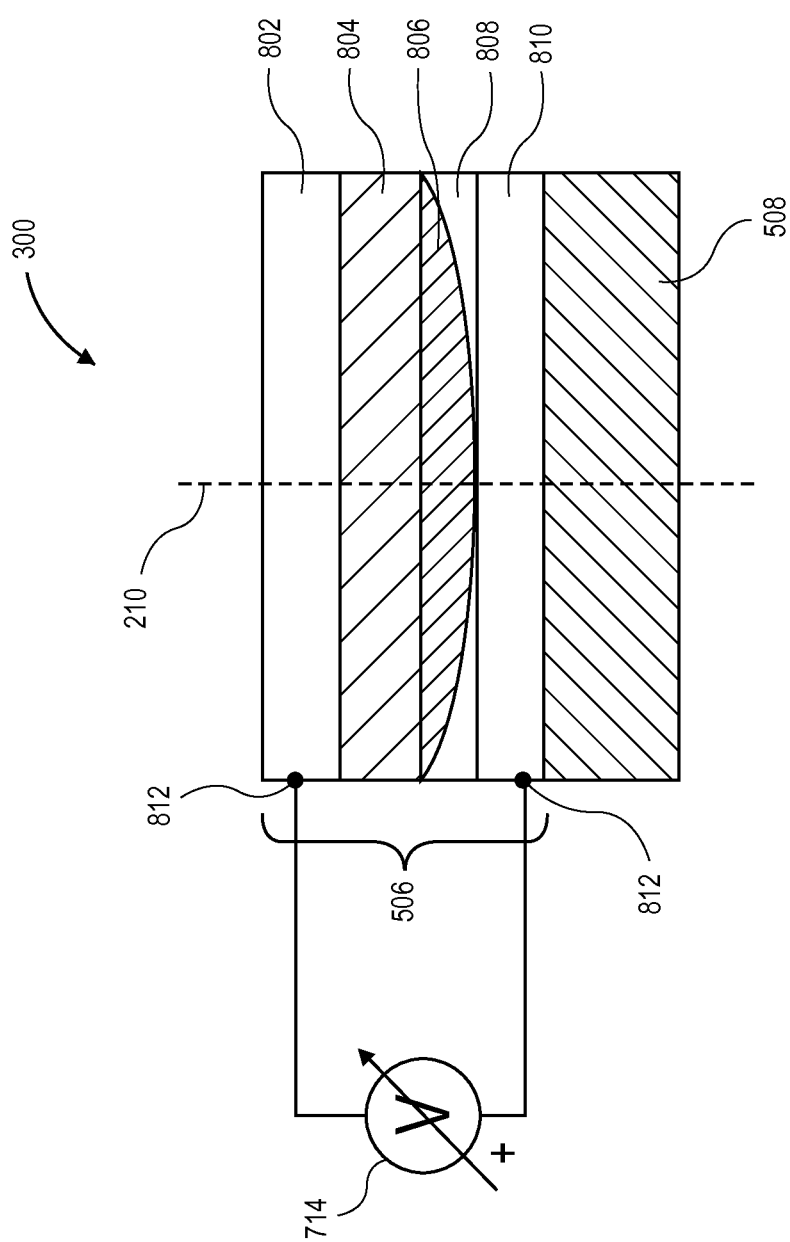
FIG. 8 is a cross-sectional view of an electro-optic aperture in accordance with an embodiment.

Referring to FIG. 8, a cross-sectional view of an electro-optic aperture is shown in accordance with an embodiment. It will be appreciated that FIG. 8 represents an embodiment of electro-optic aperture 300, but there are many different embodiments of electrically variable apertures that may be integrated in variable aperture lens 500, including both solid-state and liquid-state electro-optic apertures 300. Several of such embodiments are described in U.S. patent application Ser. No. 14/146,259, titled "Electro-Optic Aperture Device", filed on Jan. 2, 2014, which is incorporated herein by reference. The range of electro-optic apertures that are contemplated to be within the scope of this disclosure include electro-optic apertures that are apodized, continuously variable, or discretely variable. Thus, the aperture may be formed from multiple discrete steps of electrochromic layers placed on any and all surfaces of a substrate 508. A general description of one such embodiment follows.

Electro-optic aperture 300 may have a stack including electrochromic element 506 on substrate 508. Electrochromic element 506 may include: a front transparent conductor 802, an ion source 804, an ion conduction layer 806, an active electrochromic layer 808, and a rear transparent conductor 810. Each stack element may be in physical contact with an adjacent stack element. In an embodiment, ion source 804 may be fully separated from active electrochromic layer 808 by ion conduction layer 806. The ion source 804 layer may store suitable ions, for example, lithium ions to activate the electrochromic layer 808 when a sufficient charge field is generated between front transparent conductor 802 and rear transparent conductor 810. Accordingly, ion conduction layer 806 may allow ions that have been generated by ion source 804 to transmit toward and enter active electrochromic layer 808.

Rear transparent conductor 810 may be formed directly on substrate 508. The other elements of electro-optic aperture 300 may be sequentially formed over rear transparent conductor 810. In other embodiments, a second substrate (not shown) may be located above front transparent conductor 802, and in some cases, front transparent conductor 802 may be formed directly on the second substrate. In still other embodiments, such as in a liquid-state electro-optic aperture, the second substrate may be a coverslip, such as a thin layer of glass, which retains a liquid electrochromic material.

The transparent conductors may include a layer of indium tin oxide or other transparent conductive material formed into a thin layer. The transparent conductors may provide a conductive path for charge from driver circuit 714 to be applied to ion source 804 while at the same time allowing free passage of image rays 230. Accordingly, front transparent conductor 802 and rear transparent conductors 810 may be electrically connected with respective electrical contacts 812. Likewise, each of electrical contacts 812 may be electrically connected with driver circuit 714, which may provide appropriate input charge.

In an embodiment, electrical contacts 812 may be formed on front surface 510, rear surface 512, or a sidewall of electro-optic aperture 300. For example, electrical contacts 812 may be sputtered, printed, soldered, or otherwise deposited on respective transparent conductors 802, 810. Alternatively, electrical contacts 812 may be formed on substrate 508 and appropriate electrical connections, e.g., leads or vias, may be routed to corresponding transparent conductors 802, 210. Furthermore, electrical contacts 812 may be accessibly located. For example, in an embodiment, electrical contacts 812 may be located on electro-optic aperture 300 such that they are visibly exposed or at least not covered by front lens 502, rear lens 504, or any other film or coatings of variable aperture lens 500.

In an embodiment, active electrochromic layer 808 tapers from an outer edge toward optical axis 210. In other words, a thickness of active electrochromic layer 808 may decrease in a gradual or step-like fashion from the outer edge toward optical axis 210. As a result, active electrochromic layer 808 may have a thickness of essentially zero at optical axis 210. In operation, the tapered profile of active electrochromic layer 808 creates an aperture opening of a maximum size when no voltage is applied from driver circuit 714, but as driver circuit 714 increases the charge in the transparent conductors, the tapered layer will cause the aperture opening to gradually decrease in diameter toward a minimum. Thus, stop aperture of electro-optic aperture 300 may be reversibly varied by increasing and decreasing charge supplied by driver circuit 714 to the transparent conductors 802, 810. In an embodiment, an activation voltage may be between zero volts and 2 volts. Such activation voltage may result, for example, in a gradated voltage of between about 2 volts at the outer edge of active electrochromic layer 808 to zero volts at the location coincident with the aperture diameter in the active electrochromic layer 808.

In other embodiments, electro-optic aperture 300 may include a plurality of stacked electrochromic elements 506 that are independently driven to achieve different effects. For example, a front electrochromic element 506 may be driven by a first driver circuit 714 and a second electrochromic element (not shown) may be driven by a second driver circuit (not shown). In this manner, electro-optic aperture 300 as a whole may be controlled to act as a neutral density filter that exhibits substantially homogeneous reduction in intensity of light from an imaged scene across all visible colors or wavelengths of interest. In other applications, electro-optic aperture 300 may be controlled to provide polarization detection. Thus, electro-optic aperture 300 may be varied within the scope of this disclosure to provide optical effects beyond stop aperture control.

Figure 9:
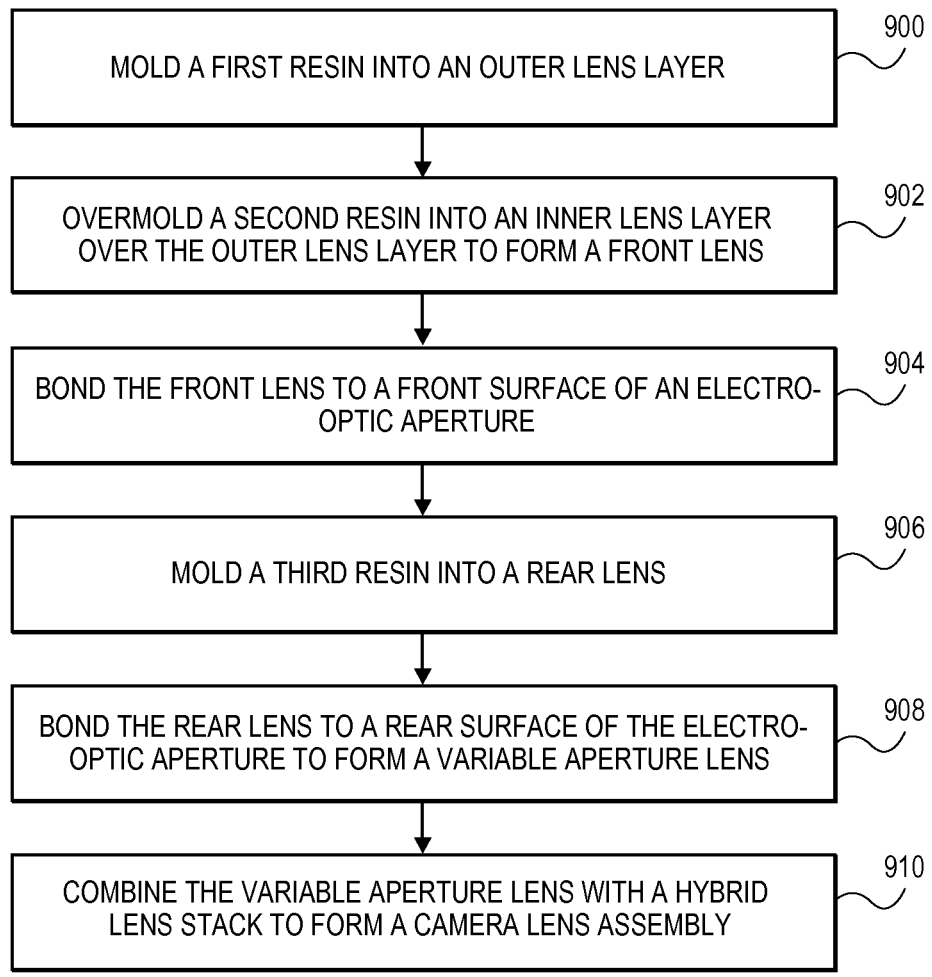
FIG. 9 is a flowchart of a method of producing a mobile lens assembly in accordance with an embodiment.

Referring to FIG. 9, a flowchart of a method of producing a mobile lens assembly is shown in accordance with an embodiment. The operations of FIG. 9 are described below with specific reference to FIGS. 10-17, which provide pictorial views illustrating operations in forming a variable aperture lens 500 in accordance with an embodiment.

Figure 10:
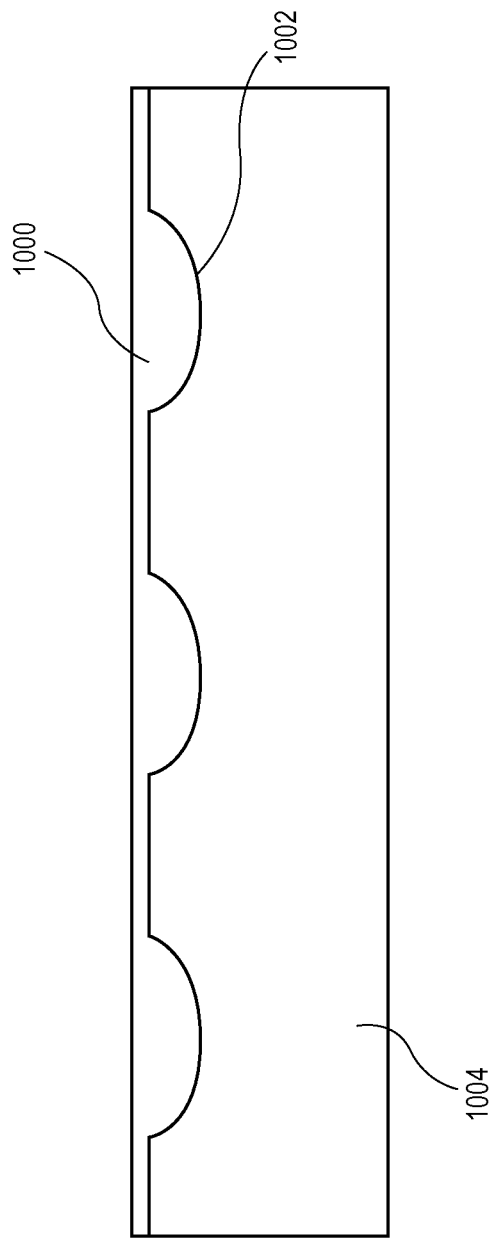
FIGS. 10-17 are pictorial views illustrating operations in forming a variable aperture lens in accordance with an embodiment.

At operation 900, outer lens layer 514 may be formed in a molding process. Referring to FIG. 10, an outer layer resin 1000 may be injected, poured, or otherwise loaded into one or more outer layer recess 1002 formed in a first mold drag 1004. Outer layer resin 1000 may be introduced into first mold drag 1004 as a liquid. Outer layer recess 1002 may have a curvature corresponding to the desired shape of outer lens layer 514. For example, outer layer recess 1002 may have a spherical contour. The finish of outer layer recess 1002 may be important to achieving an acceptable lens finish, and thus, outer layer recess 1002 may be formed in first mold drag 1004 using tool machining or electrical discharge machining processes followed by chemical or electropolishing processes. Alternatively, lens surface finish may be changed after lens formation, e.g., by vapor polishing.

Figure 11:
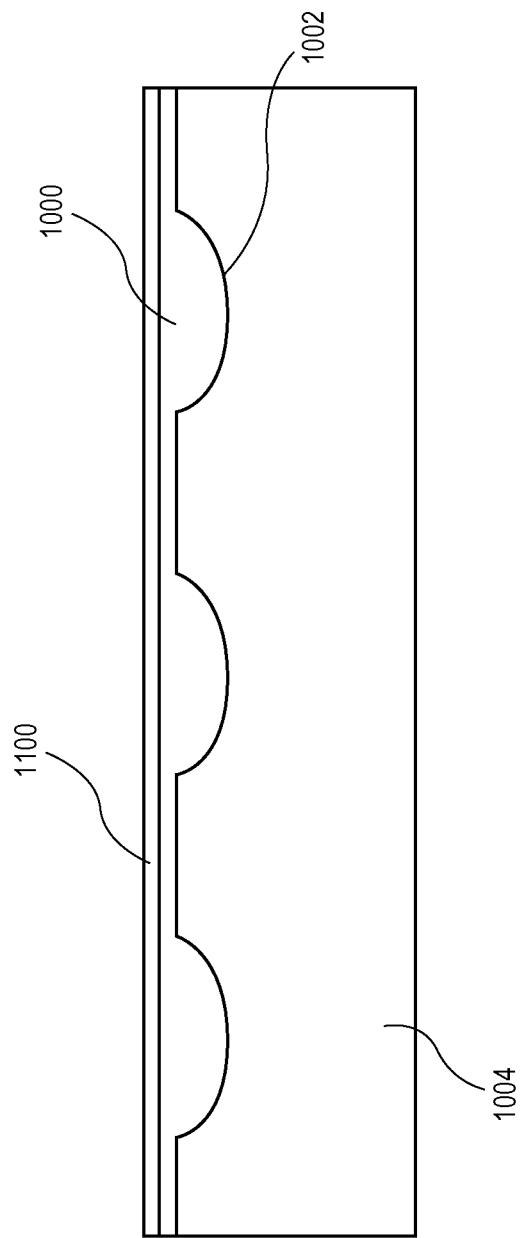

Referring to FIG. 11, a film may optionally be placed over outer layer resin 1000. Film 1100 may be flexible and provide a transparent barrier between outer layer resin 1000 and subsequently added lens resins to avoid mixing of resins prior to lens curing. Film 1100 may be any material and size that provides adequate transparency and flexibility so as not to interfere with the function and formation of outer lens layer 514 and inner lens layer 516. As an example, film 1100 may be polycarbonate, polyvinyl butyral, polyester, or polyurethane having a thickness of about 200 μm.

In an embodiment, film 1100 may include optical properties that provide certain optical characteristics to a cured lens. For example, film 1100 may include a material that includes anti-reflection and/or infrared filter properties. Thus, infrared filter 206 in mobile lens assembly 200 may be effectively relocated to coincide with front lens 502.

Figure 12:
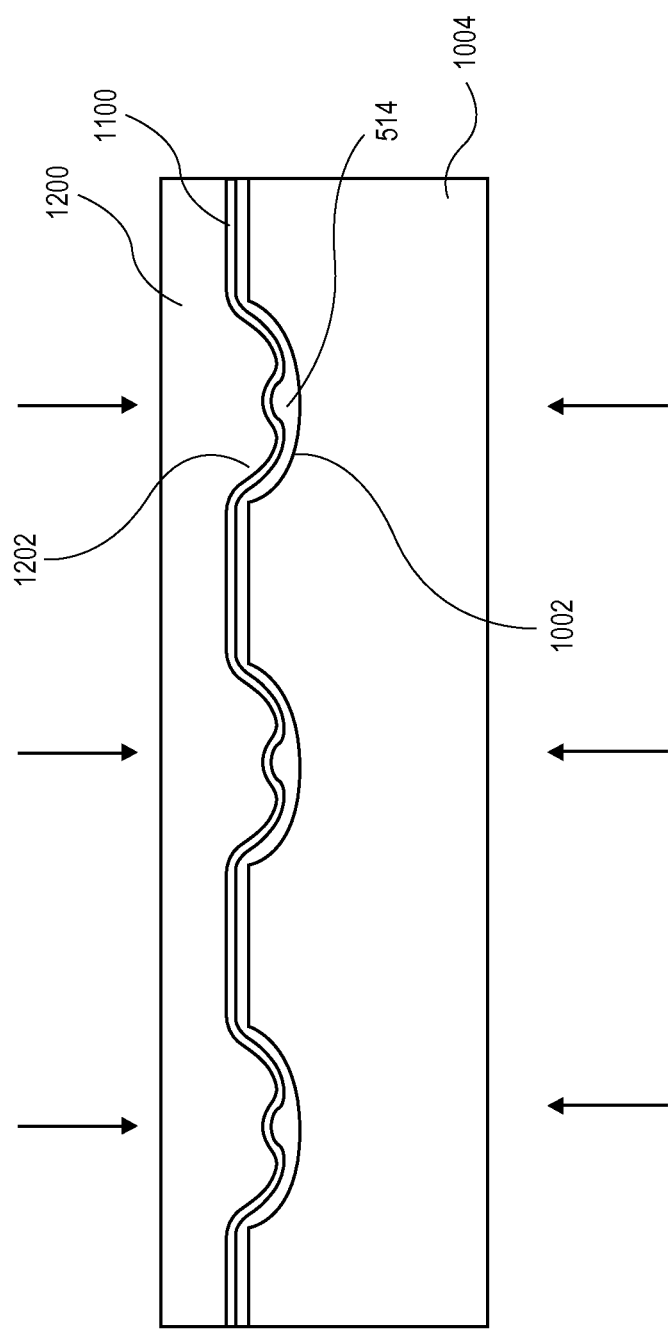

Referring to FIG. 12, a first mold cope 1200 may be brought toward first mold drag 1004 to squeeze outer layer resin 1000 into the desired shape of outer lens layer 514. More specifically, an outer layer boss 1202 of first mold cope 1200 may come toward outer layer recess 1002 of first mold drag 1004, forming a cavity having the shape of outer lens layer 514. For example, the cavity may exhibit a generally spherical outer curvature and an inner curvature having a convexity near optical axis 210, or another aspherical contour.

After outer layer resin 1000 is squeezed within the cavity between outer layer boss 1202 and outer layer recess 1002, any residual inclusions trapped within outer layer resin may be extracted. For example, the resin-filled first mold drag 1004 may be maintained under vacuum for a time period sufficient to allow trapped gas bubbles to escape. The outer layer resin 1000 may then be cured to form outer lens layer 514 of front lens 502.

Figure 13:
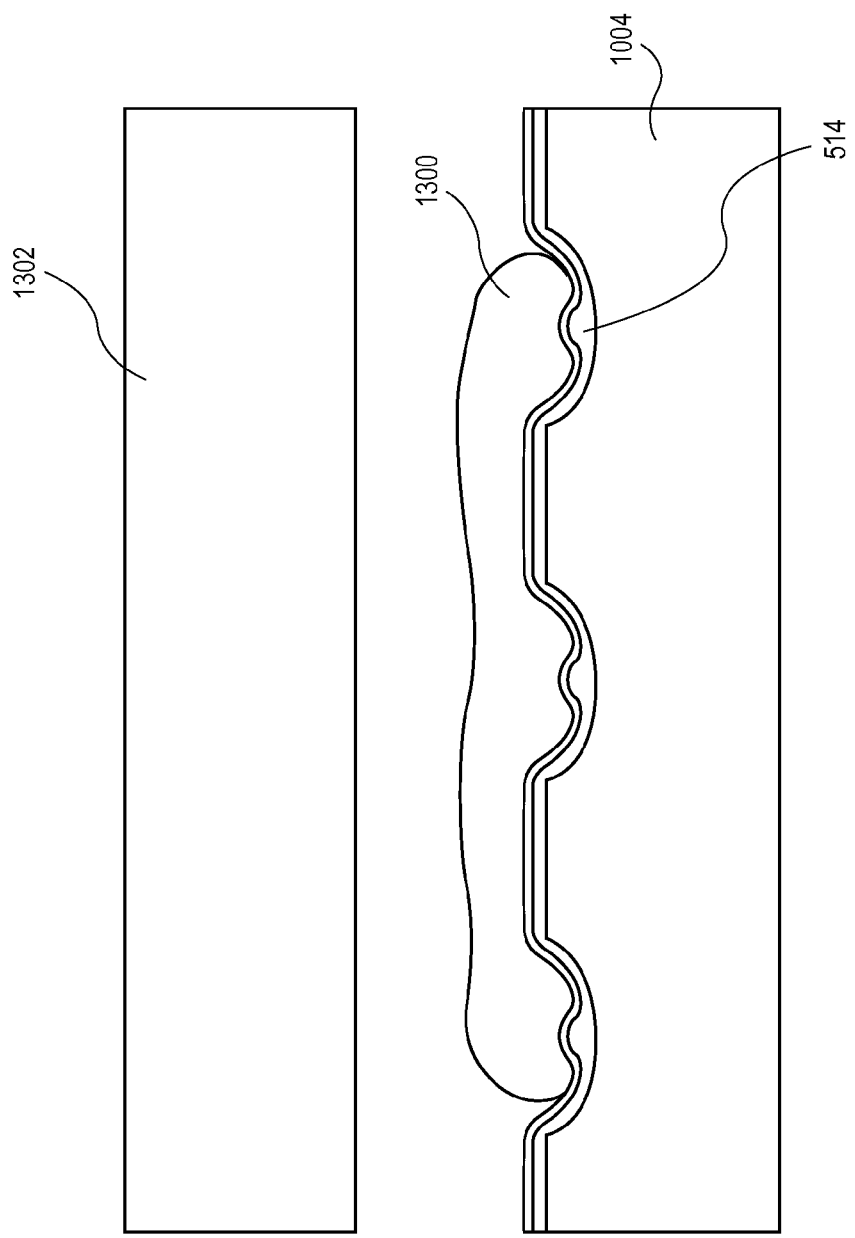

At operation 902, inner lens layer 516 may be formed over the cured outer lens layer 514 in an overmolding or replication process. Referring to FIG. 13, inner layer resin 1300 may be injected or poured over the cured outer lens layer 514 still located within first mold drag 1004. As described above, outer layer resin 1000 and inner layer resin 1300 may be different resins and/or may have different optical properties. For example, outer layer resin may include polycarbonate and inner layer resin may include polystyrene. Alternatively, both outer layer resin and inner layer resin may include polycarbonate, however the polycarbonates included in the resins may have different optical properties, e.g., refractive indices.

Figure 14:
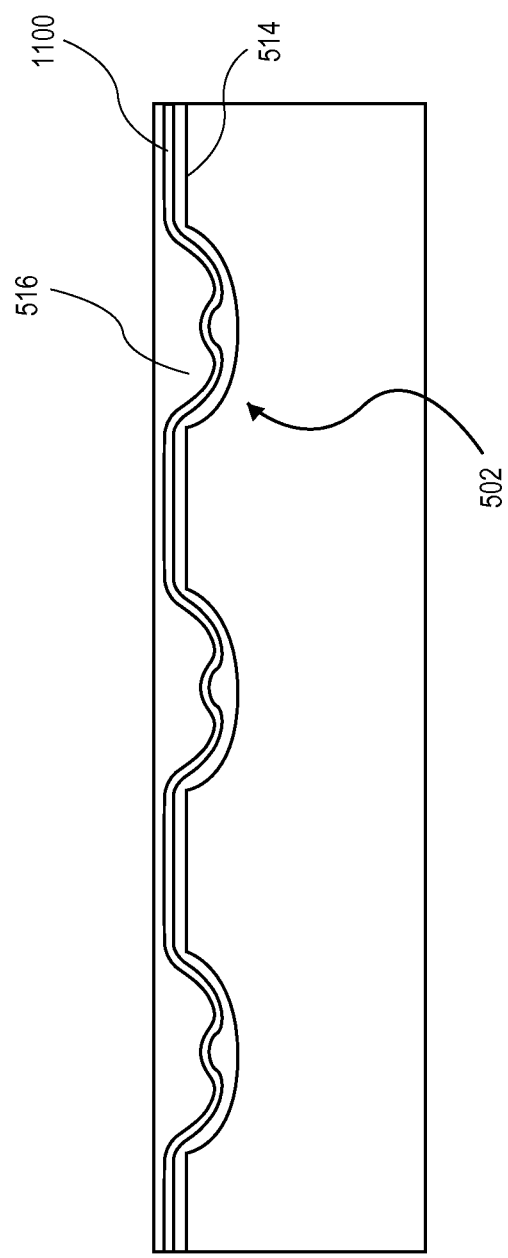
Figure 15:
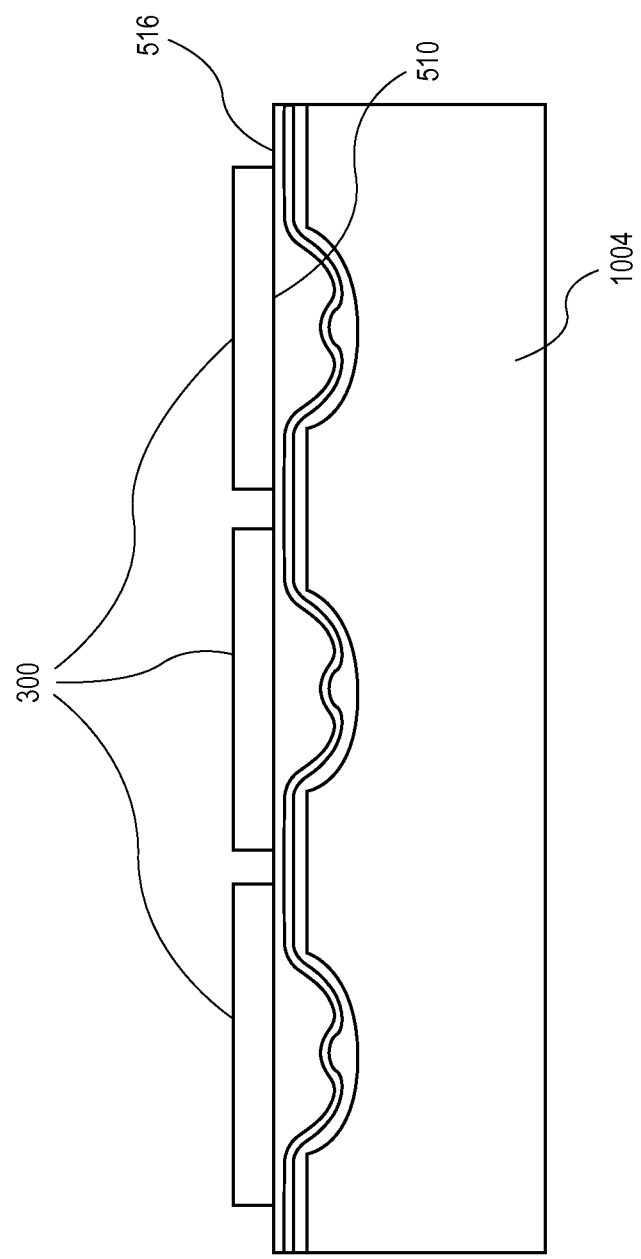

In an embodiment, a second mold cope 1302 having a generally flat lower surface may be brought toward the first mold drag 1004 to spread and squeeze inner layer resin 1300 against first mold drag 1004. As above, inner layer resin 1300 may be placed under vacuum and cured such that the cured resin forms inner lens layer 516 shape, e.g., having a concavity near optical axis 210. Referring to FIG. 14, after curing inner layer resin 1300 and removing second mold cope 1302, front lens 502 may be integrally formed and include outer lens layer 514, inner lens layer 516, and optionally, film 1100.

At operation 904, front lens 502 may be bonded to electro-optic aperture 300. For example, referring to FIG. 15, electro-optic aperture 300 may be picked and placed such that front surface 510 contacts inner lens layer 516. Prior to placement, an adhesive may be added to electro-optic aperture 300 or inner lens layer 516 to form a chemical bond between the components. The adhesive layer may include a radiation-activated or thermosetting adhesive that cures to form a substantially transparent thin layer having a thickness of about 5 to 150 µm. Alternatively, the contacting components may be heated to form a thermal bond therebetween, or otherwise attached, joined, fixed, secured, or fastened.

In an alternative embodiment, front lens 502 may be separated prior to being bonded to electro-optic aperture 300. For example, the plurality of front lenses 502 shown in first mold drag 1004 may be separated from each other before or after being removed from first mold drag 1004. Separation may be made by laser cutting, e.g., excimer laser cutting using a mask, or any other known technique. After the front lenses 502 are separated, they may be bonded to electro-optic aperture 300 using adhesives, e.g., ultraviolet radiation, thermal, or chemically activated adhesives.

Figure 16:
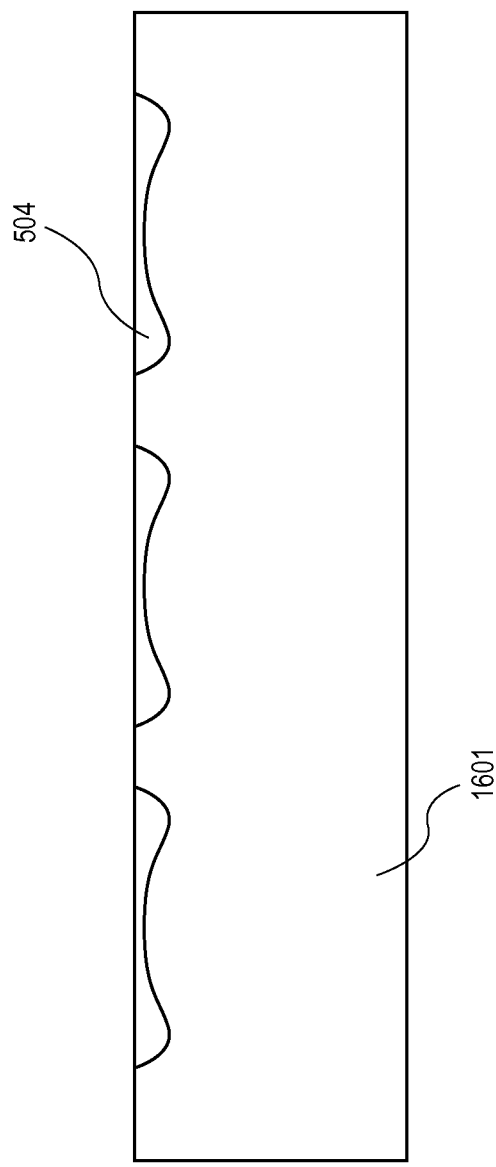

At operation 906, rear lens 504 may be formed using a similar methodology used to form front lens 502. Referring to FIG. 16, a second mold drag 1601 may include one or more recesses having the shape of rear lens 504 in an upper surface. Thus, rear lens 504 may be formed in second mold drag 1601 by pouring or injecting an appropriate resin into the recesses, optionally flattening the resin and placing the resin under vacuum, and then curing the rear lens 504 into the desired final form. In an embodiment, rear lens 504 is not flattened, e.g., by another mold cope, prior to curing, and in such case, shrinkage of resin material may be accommodated for by filling recesses in second mold drag 1601 to include a convex meniscus prior to curing. The meniscus may shrink to a flattened surface after curing. The rear lens 504 may be formed from a rear lens 504 resin that is the same or different than outer layer resin 1000 and inner layer resin 1300. Thus, front lens 502 and rear lens 504 may include different indices of refraction and/or other material or optical properties consistent with an intended lens design.

Figure 17:
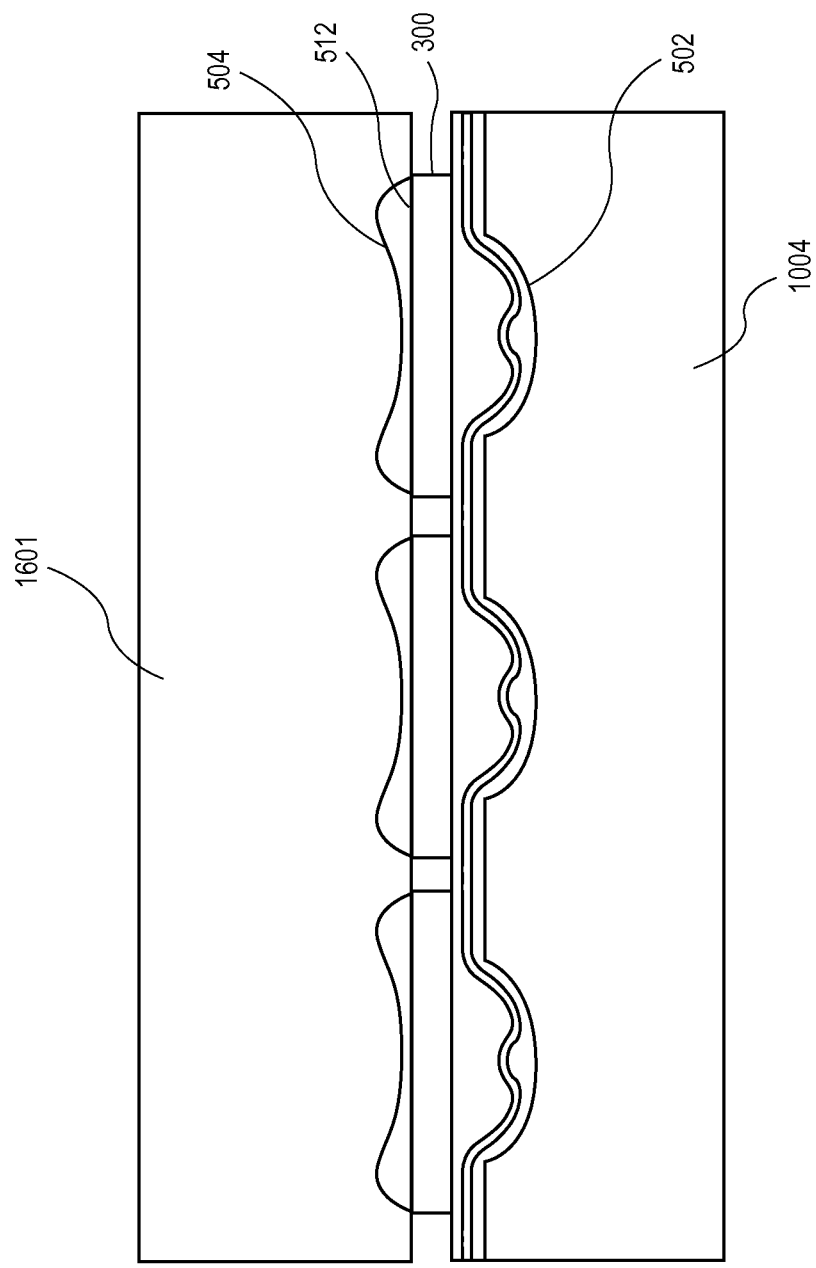

At operation 908, rear lens 504 may be bonded to rear surface 512 of electro-optic aperture 300 to form variable aperture lens 500. Referring to FIG. 17, in an embodiment, second mold drag 1601 having cured rear lens 504 may be brought toward first mold drag 1004 to bring rear lens 504 and rear surface 512 of electro-optic aperture 300 into contact. An adhesive may be placed on either of the mating surfaces prior to bringing them into contact, or the surface may be subjected to thermal heating to form a bond therebetween. Thus, a vertical stack may be formed having front lens 502, electro-optic aperture 300, and rear lens 504. More specifically, variable aperture lens 500 may be integrally formed. Alignment between each of the components of variable aperture lens 500 may be controlled during bonding to ensure that each is substantially aligned, and fixed relative to each other, along optical axis 210.

Figure 18:
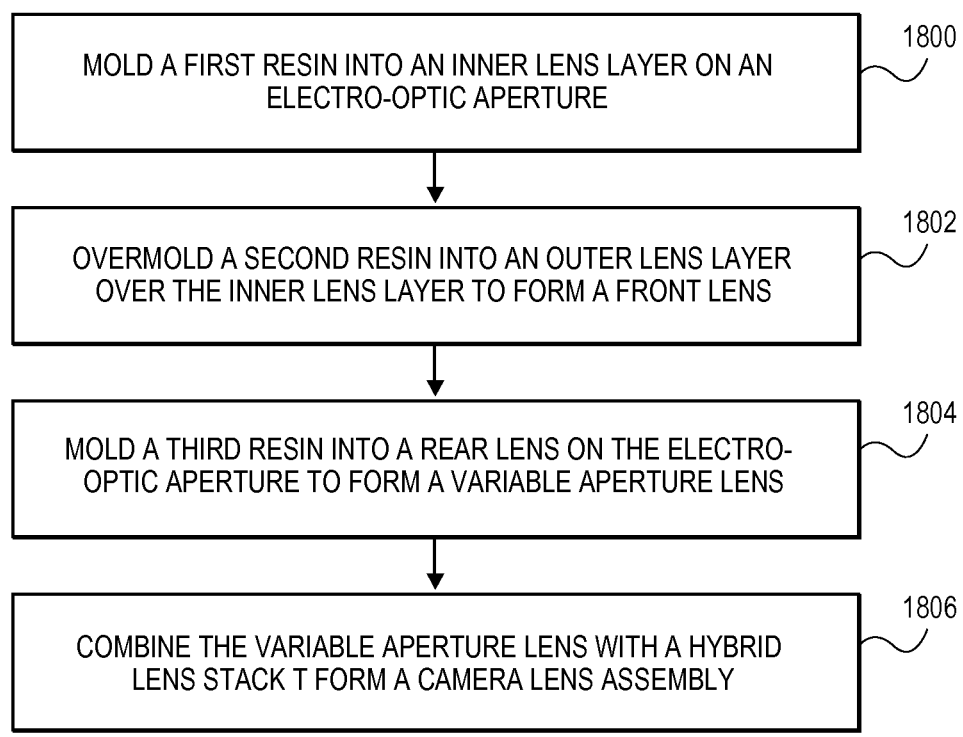
FIG. 18 is a flowchart of a method of producing a mobile lens assembly in accordance with an embodiment.

Referring to FIG. 18, a flowchart of a method of producing a mobile lens assembly is shown in accordance with an embodiment. The operations of FIG. 18 are described below with specific reference to FIGS. 19-23, which provide pictorial views illustrating operations in forming a variable aperture lens 500 in accordance with an embodiment.

Figure 19:
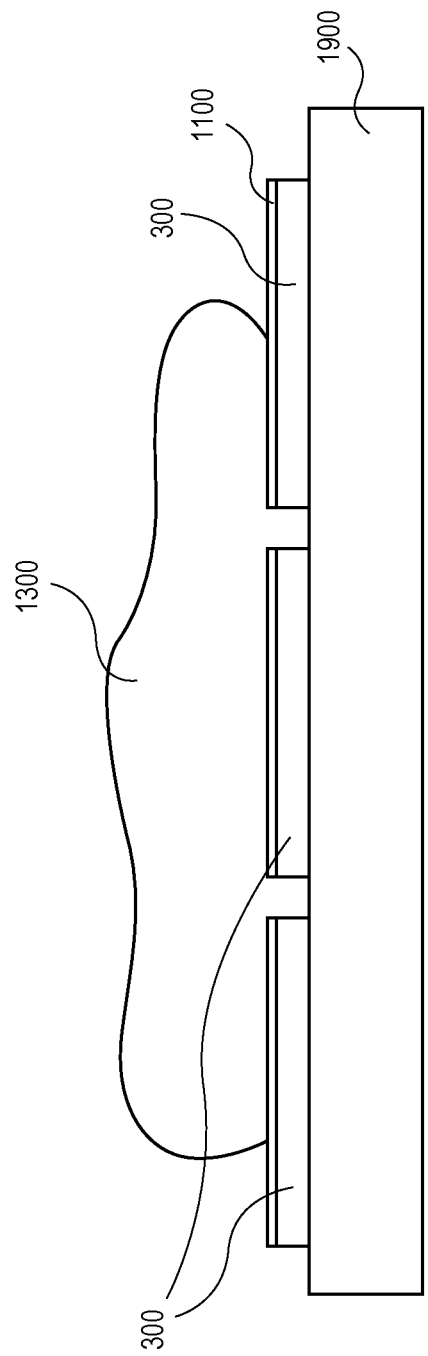

At operation 1800, inner lens layer 516 may be formed in a molding process. Referring to FIG. 19, a plurality of electro-optic apertures 300 may be provided. For example, electro optic apertures 300 may be provided on a sheet or wafer 1900. In an embodiment, electro-optic apertures include film 1100 laminated on front surface 510 and/or rear surface 512. Film 1100 may be, for example, a dielectric material that is sputtered, grown, or otherwise deposited.

An inner layer resin 1300 may be injected, poured, or otherwise loaded over electro-optic apertures 300 in an uncured state. For example, inner layer resin 1300 may be introduced as a liquid.

Figure 20:
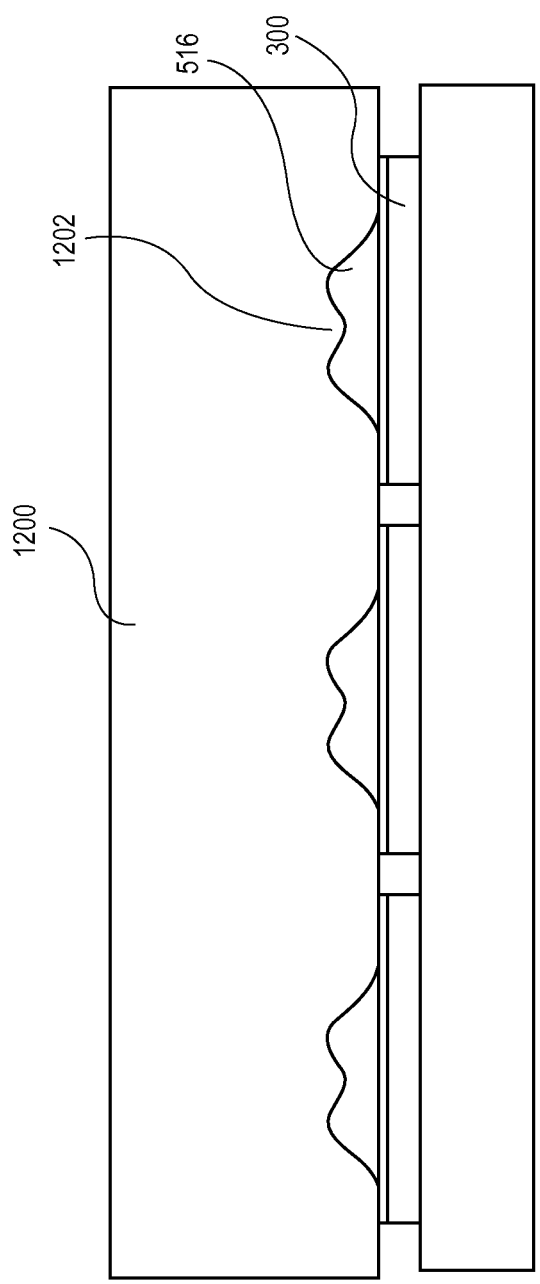

Referring to FIG. 20, a first mold cope 1200 may be brought toward electro-optic apertures 300 to squeeze inner layer resin 1300 into the desired shape of inner lens layer 516. More specifically, an outer layer boss 1202 of first mold cope 1200 may come toward electro-optic aperture 300, forming a replicated cavity having the shape of inner lens layer 516. For example, the cavity may exhibit a concavity near optical axis 210, or another aspherical contour.

After inner layer resin 1300 is squeezed within the cavity between outer layer boss 1202 and electro-optic aperture 300, any residual inclusions trapped within inner layer resin 1300 may be extracted under vacuum. The inner layer resin 1300 may then be cured to form inner lens layer 516 of front lens 502.

Figure 21:
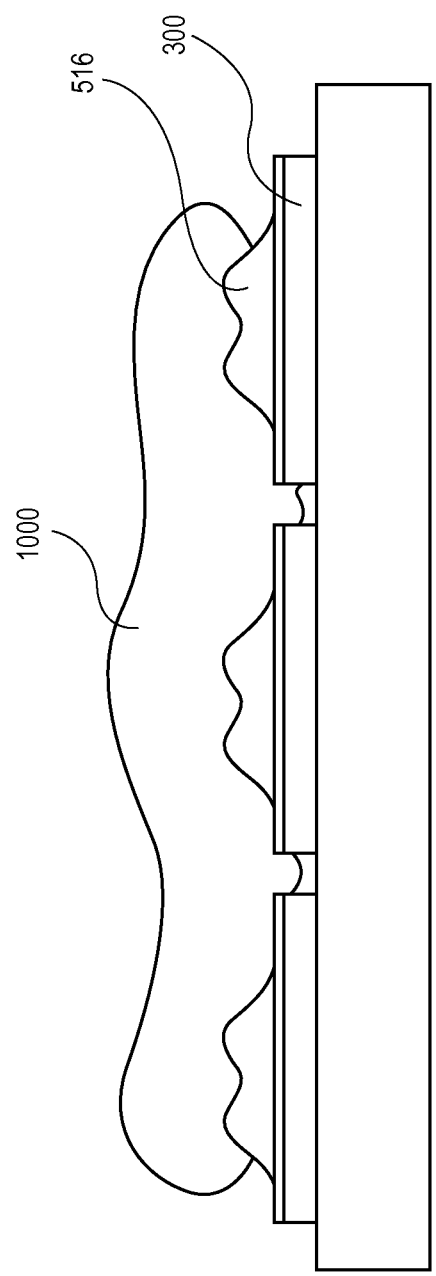
Figure 22:
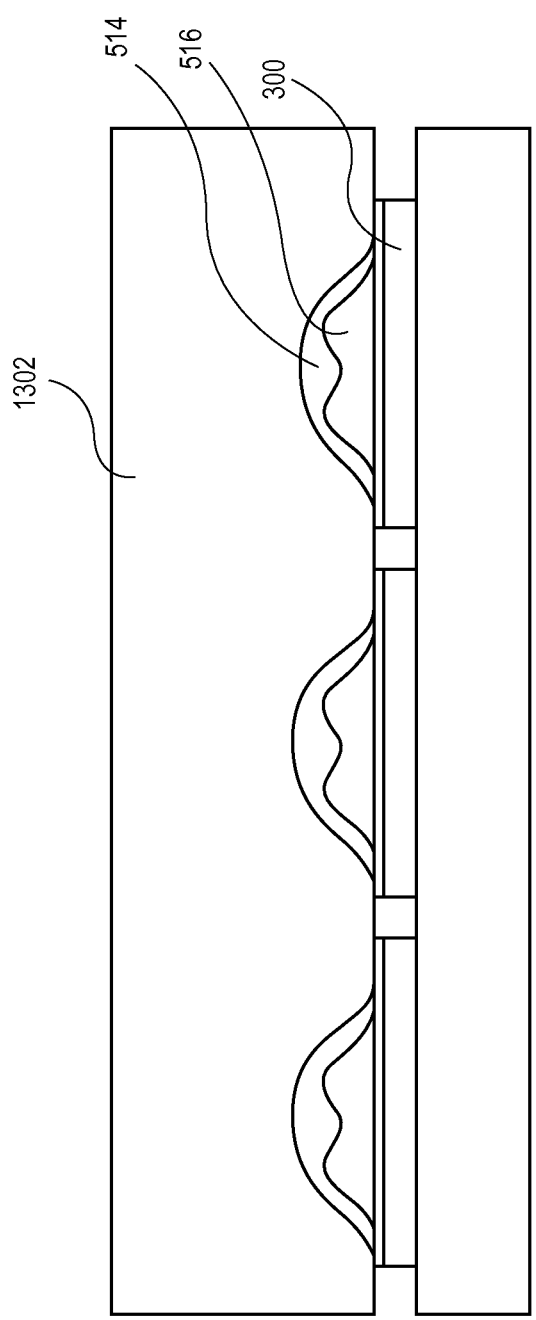

At operation 1802, outer lens layer 514 may be formed over the cured inner lens layer 516 in an overmolding or replication process. Referring to FIG. 21, outer layer resin 1000 may be injected or poured over the cured inner lens layer 516. Referring to FIG. 22, in an embodiment, a second mold cope 1302 having a generally flat lower surface may be brought toward electro-optic aperture 300 to spread and squeeze outer layer resin 1000 against inner lens layer 516. As above, outer layer resin 1000 may be placed under vacuum and cured such that the cured resin forms outer lens layer 514 shape, e.g., having a generally spherical outer surface and a convexity near optical axis 210. After curing outer layer resin 1000, front lens 502 may be integrally formed and include outer lens layer 514 and inner lens layer 516. In an embodiment, film 1100 is located between outer lens layer 514 and inner lens layer 516. For example, in substitution for or in addition to film 1100 over electro-optic aperture 300 surfaces, film 1100 may be deposited over cured inner lens layer 516 prior to introducing and curing outer lens resin 1000. Thus, a dielectric film layer may be provided between outer lens layer 514 and inner lens layer 516.

At operation 1804, rear lens 504 may be formed using a similar methodology used to form front lens 502. Referring to FIG. 23, electro-optic apertures 300 may be removed from wafer 1900. For example, front lens 502 may remain engaged with second mold cope 1302 and lifted away from wafer 1900. Second mold cope 1302 may then be turned over such that electro-optic apertures 300 have rear surface 512 facing upward, although the directionality of the surfaces is not restrictive. An appropriate rear lens resin may be poured over electro-optic apertures, and a third mold cope 2300 having recesses corresponding to a shape of rear lens 504 may be brought toward electro-optic apertures 300. Thus, the rear lens resin may be squeezed into the shape of rear lens 504. The rear lens resin may then be placed under vacuum and cured to form rear lens 504. Thus, a vertical stack may be formed having front lens 502, electro-optic aperture 300, and rear lens 504. More specifically, variable aperture lens 500 may be integrally formed. Alignment between each of the components of variable aperture lens 500 may be controlled during the molding and overmolding processes to ensure that each is substantially aligned, and fixed relative to each other, along optical axis 210.

In an embodiment, the curable resins may include curable resins that maintain transparency upon curing. Examples of such resins include compositions that are curable by ultraviolet radiation, such as: polycarbonates, polystyrenes, polyacrylates, polyester compounds, silicones, acrylic resin, urethane resin, epoxy resin, enthiol resin, or thiourethane resin or photopolymer. In an embodiment, curing of outer layer resin 1000 and inner layer resin 1300 may involve exposure of the uncured resin to ultraviolet radiation having an intensity of between about 100 to 2,000 W/cm$^2$ over a period of approximately one minute. Portions of the mold may be transparent, or special transmissive inserts may be used, to allow the ultraviolet radiation to irradiate the lens resins. In other embodiments, resins may be cured at according to predetermined time and temperature profiles. The cured lenses may also be post-cured. For example, the lenses may be stabilized at high temperatures for a period of time, e.g., between about 100 to 150 degrees Celsius for 6 to 12 hours.

The lenses and/or electro-optic aperture 300 may be further treated to introduce additional optical characteristics to variable aperture lens 500. For example, one or more surfaces of front lens 502, rear lens 504, or electro-optic aperture 300 may be coated with anti-reflective coating or optical filter material, e.g., infrared filter 206 material, to provide variable aperture lens 500 with optical filtering capabilities. As described above, in an embodiment, film 1100 may be layered over any and all surfaces of electro-optic aperture to provide additional optical characteristics.

The manufacturing process may also account for the introduction of additional features not directly addressed above. For example, it may be necessary to form electrical contacts 812 on electro-optic aperture 300 at locations that are accessible to allow for electrical connections to be provided for varying the voltage to electrochromic elements. Thus, electrical contacts 812 may be placed on front surface 510, rear surface 512, or on a sidewall of electro-optic aperture 300, and on substrate 508 in particular, to allow such electrical connections to be formed. Accordingly, electrical contacts 812 may be formed prior to lens overmolding. Alternatively, locations dedicated to the formation of contacts after overmolding may be exposed to view and/or accessible through front lens 502 or rear lens 504 of variable aperture lens 500.

After forming a sheet or wafer of variable aperture lenses 500 by bonding the front lens 502, electro-optic aperture 300, and rear lens 504 into a final assembly, each of the variable aperture lenses 500 may be separated using known separation techniques. For example, various chemical, laser, mechanical, etc., cutting operations may be used to separate the variable aperture lenses 500 into individual parts. Separation may be performed before or after removing the mold drags from the variable aperture lenses.

After forming variable aperture lens, for example, at operations 910 or 1806, variable aperture lens 500 may be combined with a lens stack 204 to from a camera lens assembly. More particularly, variable aperture lens 500 may be physically associated with one or more optical components, such as lens stack 204, infrared filter 206, image sensor 208, etc., to form mobile lens assembly 200 for use in portable consumer electronics device 100. Such physical association may be made by incorporating variable aperture lens 500 within a chassis, barrel, frame, or other mechanical holder or carrier that supports and positions variable aperture lens 500 relative to other lenses in mobile lens assembly 200. In an embodiment, the holder or carrier does not need to be rotated in order to focus an image on image sensor 208.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An optical element, comprising:
   an electro-optic aperture including an electrochromic element mounted on a substrate, wherein the electrochromic element is an electrically variable pupil, and wherein the electro-optic aperture includes a flat front surface and a flat rear surface;
   a front lens having a flat front lens surface attached to the flat front surface of the electro-optic aperture, wherein the front lens is a first portion of an achromatic lens to limit chromatic aberration; and
   a rear lens having a flat rear lens surface attached to the flat rear surface of the electro-optic aperture, wherein the rear lens is aligned with the front lens along an optical axis, and wherein the rear lens is a second portion of the achromatic lens;
   wherein at least one of the front lens or the rear lens includes a plurality of lens layers, wherein the plurality of lens layers include a first lens layer laminated on a second lens layer, wherein the plurality of lens layers have different optical properties, wherein the achromatic lens is an achromatic doublet, wherein the front lens is a positive element of the achromatic doublet, and wherein the rear lens is a negative element of the achromatic doublet.

2. The optical element of claim 1, wherein the electro-optic aperture and the substrate are aligned along the optical axis between the front lens and the rear lens.

3. The optical element of claim 2, wherein the electro-optic aperture, the front lens, and the rear lens are aligned along the optical axis.

4. The optical element of claim 1, wherein the plurality of lens layers include a resin material.

5. The optical element of claim 4, wherein the resin material is configured to be cured by ultraviolet radiation.

6. The optical element of claim 1, wherein the electrochromic element includes at least one of a liquid, a crystalline material, or a non-crystalline material.

7. The optical element of claim 1 further comprising an electro-optic filter between the front lens and the rear lens.

8. The optical element of claim 1 further comprising an electrical contact on the substrate, wherein the electrical contact is exposed from the front lens and the rear lens.

9. The optical element of claim 1 further comprising a dielectric film between the first lens layer and the second lens layer.

10. The optical element of claim 1, wherein the first lens layer and the second lens layer include a same lens material.

11. A method of producing a mobile lens assembly, comprising:
attaching a flat front lens surface of a front lens to a flat front surface of an electro-optic aperture, wherein the electro-optic aperture includes an electrochromic element mounted on a substrate, and wherein the electrochromic element is an electrically variable pupil, and wherein the front lens is a positive element of an achromatic doublet to limit chromatic aberration;
attaching a flat rear lens surface of a rear lens to a flat rear surface of the electro-optic aperture to form a variable aperture lens, wherein the rear lens is aligned with the front lens along an optical axis, and wherein the rear lens is a negative element of the achromatic doublet; and
combining the variable aperture lens with a lens stack to form a mobile lens assembly, wherein the lens stack includes one or more aberration-correction lenses to limit monochromatic aberrations;
wherein at least one of the front lens or the rear lens includes a plurality of lens layers, and wherein the plurality of lens layers include a first lens layer laminated on a second lens layer.

12. The method of claim 11 further comprising:
molding a first resin into the second lens layer; and
overmolding a second resin into the first lens layer over the second lens layer to form the one or more of the front lens or the rear lens.

13. The method of claim 12, wherein the first resin and the second resin have different optical properties.

14. The method of claim 13 further comprising molding a third resin into one or more of the front lens or the rear lens.

15. The method of claim 14, wherein at least one of the first resin, the second resin, or the third resin is configured to be cured by ultraviolet radiation.

16. The method of claim 12 further comprising depositing a film between the first lens layer and the second lens layer.

17. The method of claim 11, wherein the attaching further includes aligning the front lens, the rear lens, and the electro-optic aperture along the optical axis.

18. The method of claim 17, wherein the attaching further includes molding at least one of the front lens or the rear lens directly over the electro-optic aperture.

19. The method of claim 18, wherein the molding includes introducing a lens resin in an uncured state and curing the lens resin into a cured state.

* * * * *